United States Patent [19]
Shaffer

[11] Patent Number: 6,003,199
[45] Date of Patent: Dec. 21, 1999

[54] AIR CONCENTRATOR NOZZLE FOR PORTABLE BLOWER

[75] Inventor: Chadwick A. Shaffer, Oakdale, Minn.

[73] Assignee: The Toro Company, Bloomington, Minn.

[21] Appl. No.: 09/079,546

[22] Filed: May 15, 1998

Related U.S. Application Data

[63] Continuation-in-part of application No. 09/038,365, Mar. 10, 1998.

[51] Int. Cl.⁶ .................................................. A47L 5/14
[52] U.S. Cl. .............................. 15/405; 15/414; 15/415.1
[58] Field of Search ........................ 15/405, 414, 415.1, 15/417

[56] References Cited

U.S. PATENT DOCUMENTS

| | | | |
|---|---|---|---|
| D. 263,547 | 3/1982 | Carsello | D32/15 |
| D. 297,274 | 8/1988 | Komiya et al. | D32/15 |
| D. 357,774 | 4/1995 | Kishi | D32/25 |
| D. 382,683 | 8/1997 | Henke et al. | D32/25 |
| 2,068,496 | 1/1937 | Linghammar | 15/155 |
| 2,586,145 | 2/1952 | Breuer et al. | 299/11 |
| 3,938,218 | 2/1976 | DeAmicis | 15/401 |
| 4,553,284 | 11/1985 | Strumbos | 15/414 |
| 4,610,048 | 9/1986 | Ishihara et al. | 15/344 |
| 4,746,274 | 5/1988 | Kiyooka et al. | 417/234 |
| 5,533,230 | 7/1996 | Rouda | 15/339 |
| 5,584,436 | 12/1996 | Sepke | 239/154 |
| 5,652,995 | 8/1997 | Henke et al. | 15/344 |
| 5,689,852 | 11/1997 | Svoboda et al. | 15/405 |

*Primary Examiner*—William H. Beisner
*Attorney, Agent, or Firm*—Donald S. Trevarthen

[57] ABSTRACT

An improved air concentrator nozzle for creating an increased air exit velocity from an extension tube of a portable blower or blower/vacuum. The extension tube tapers from a larger, upstream end to a smaller, downstream end. The nozzle is inserted into the upstream end of the extension tube and drops until it protrudes outwardly from the downstream end of the extension tube. An interference fit between an exterior surface of the nozzle and an interior surface of the downstream end of the extension tube restrains the nozzle relative to the tube.

9 Claims, 26 Drawing Sheets

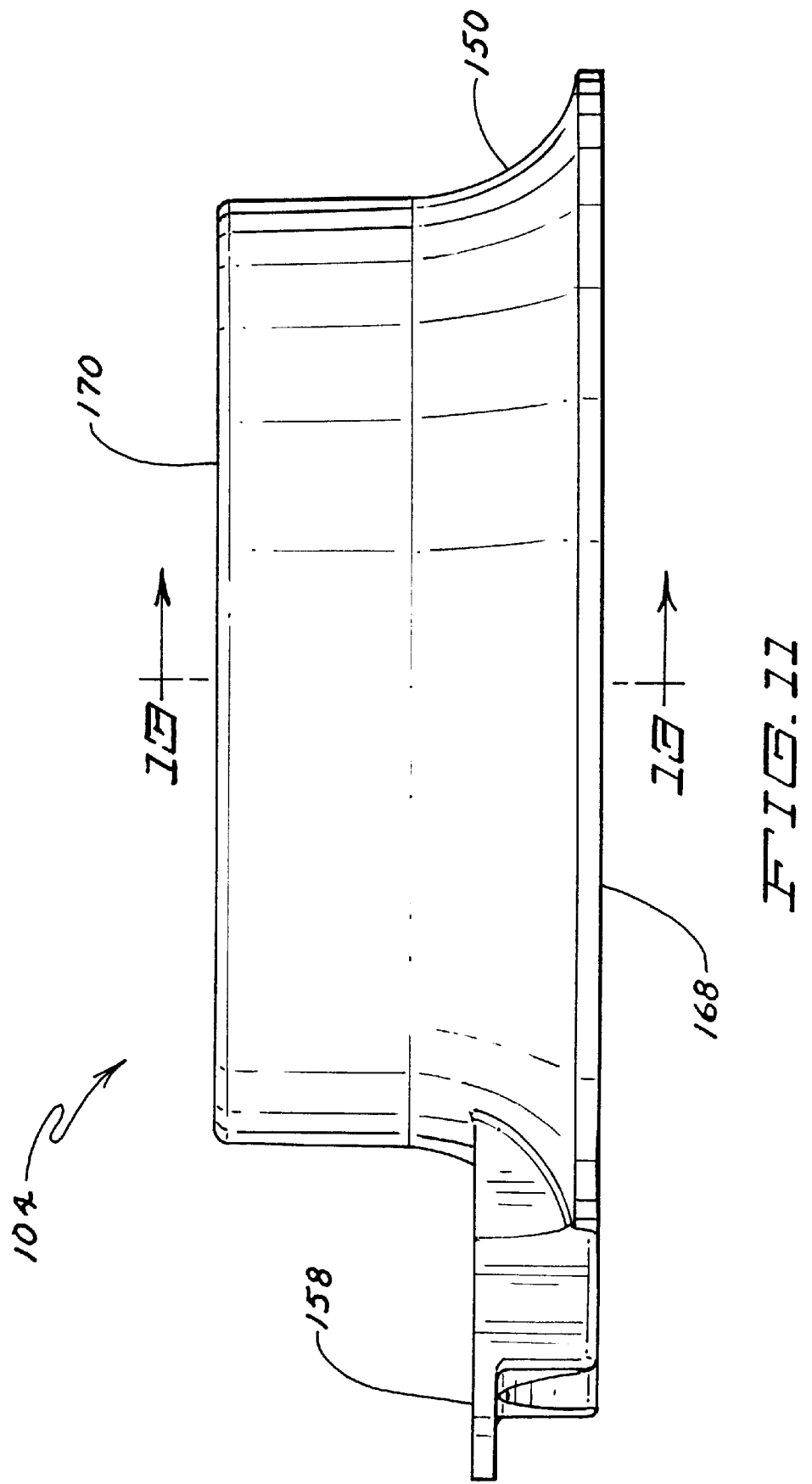

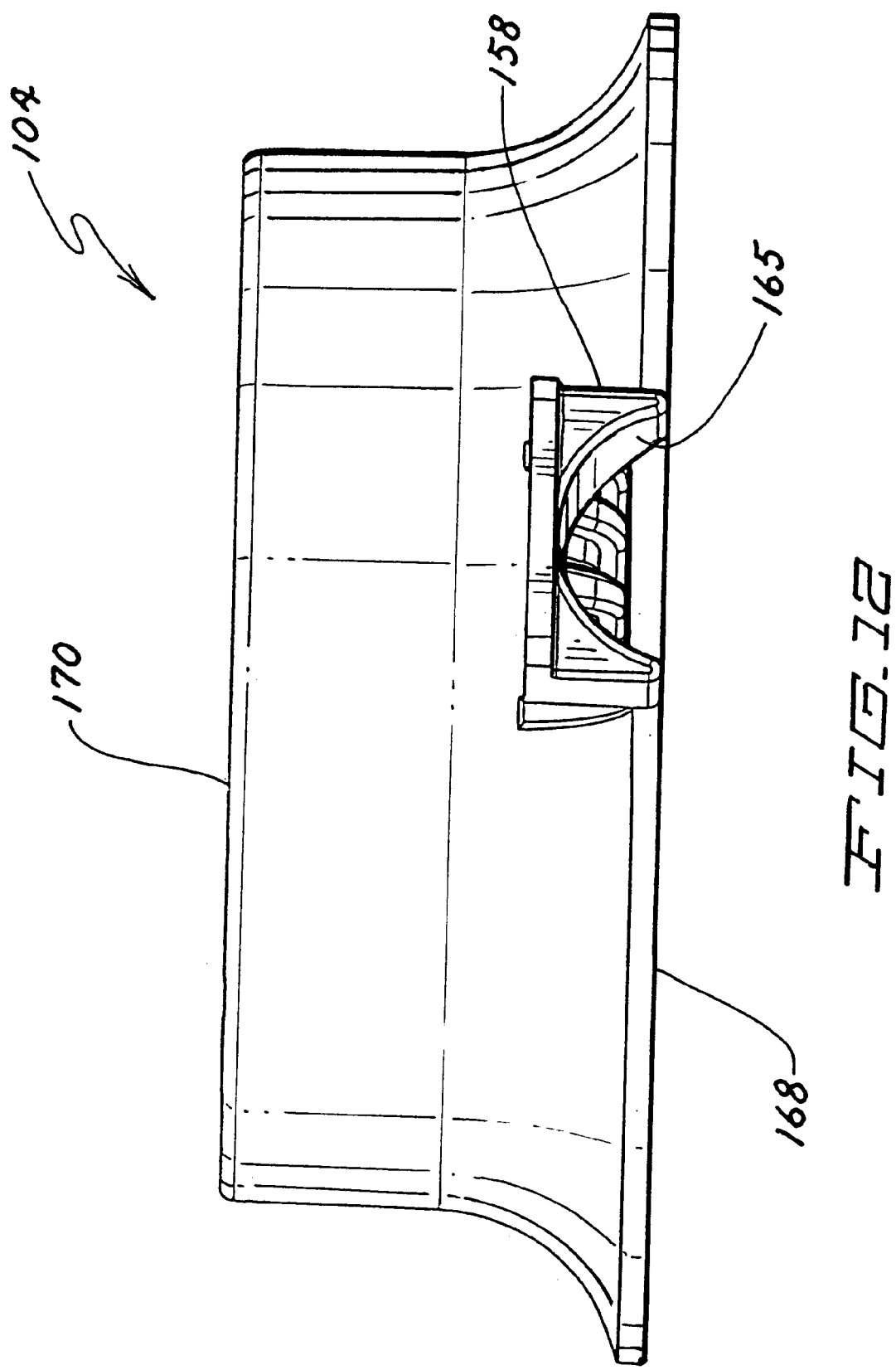

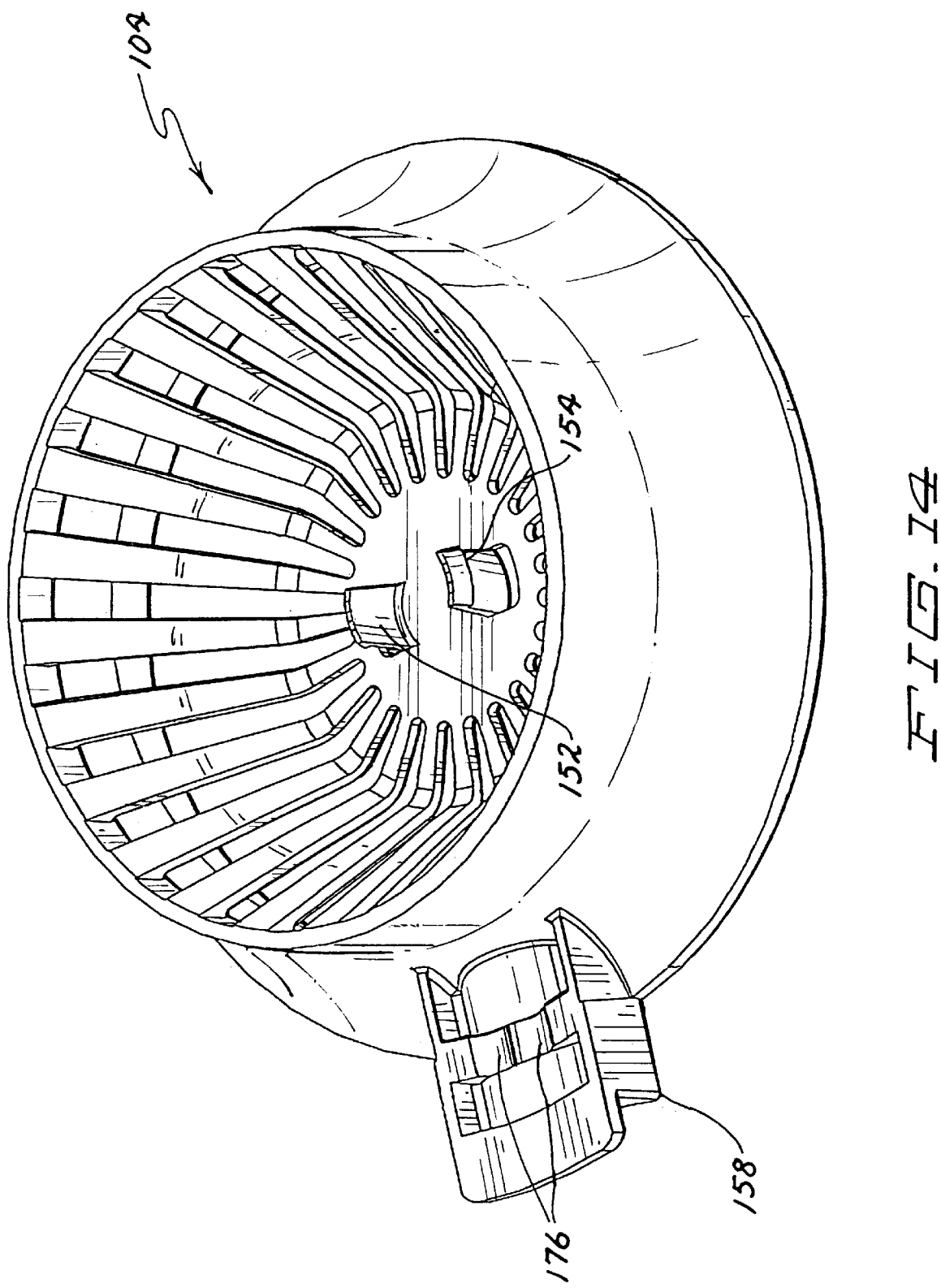

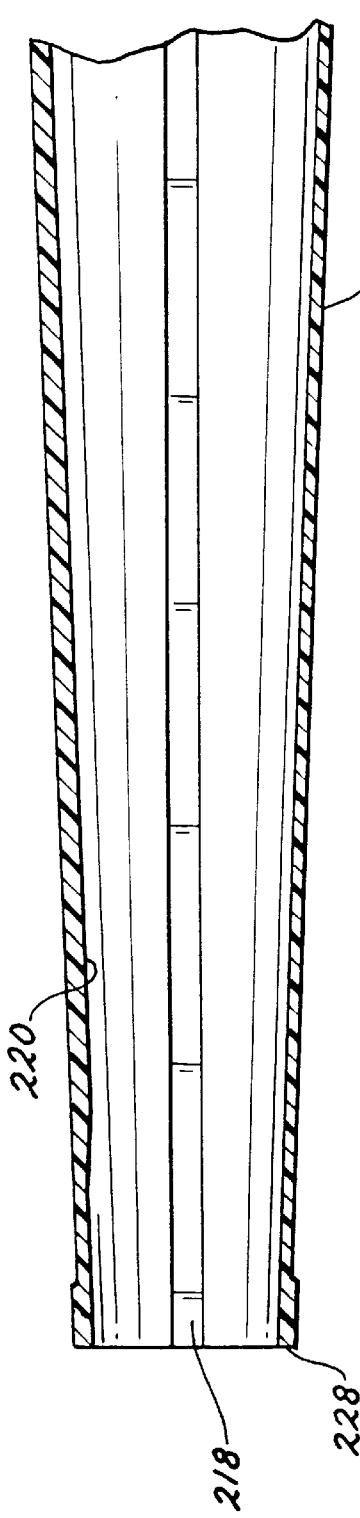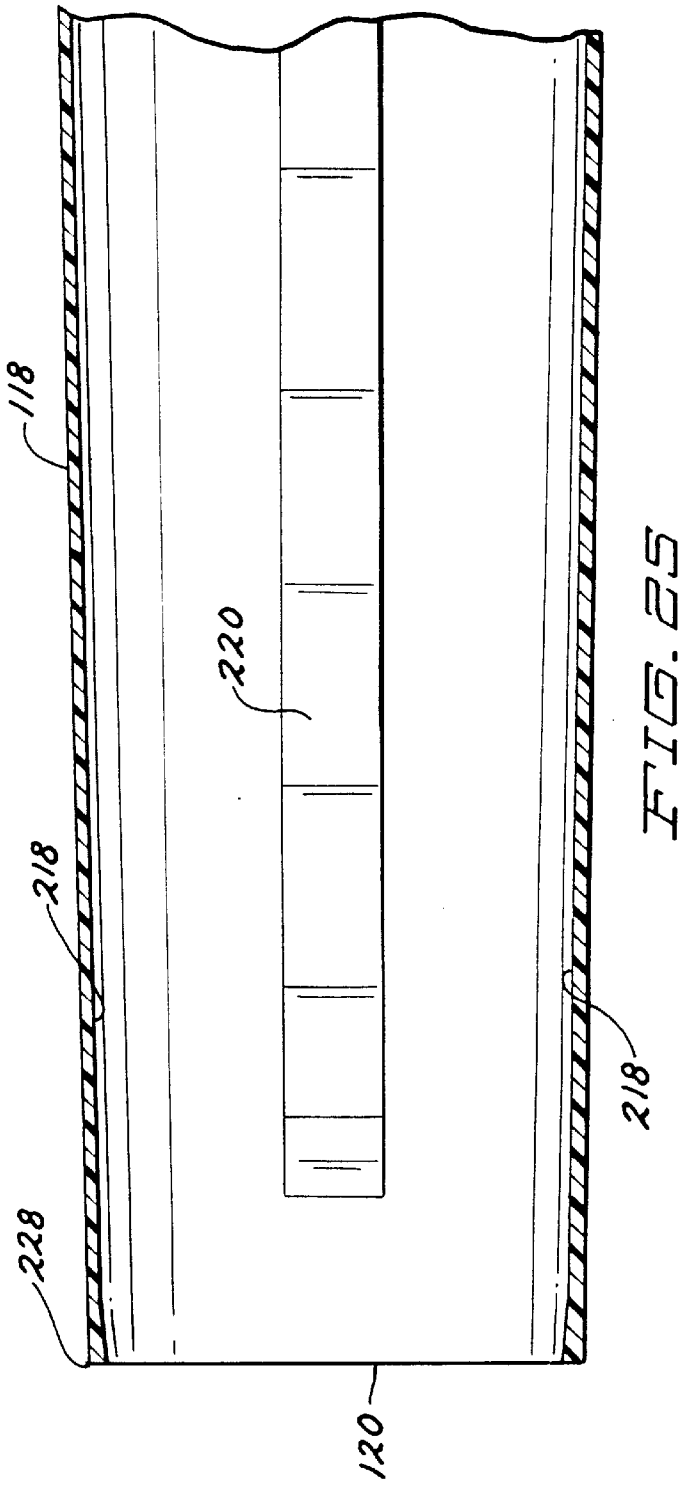

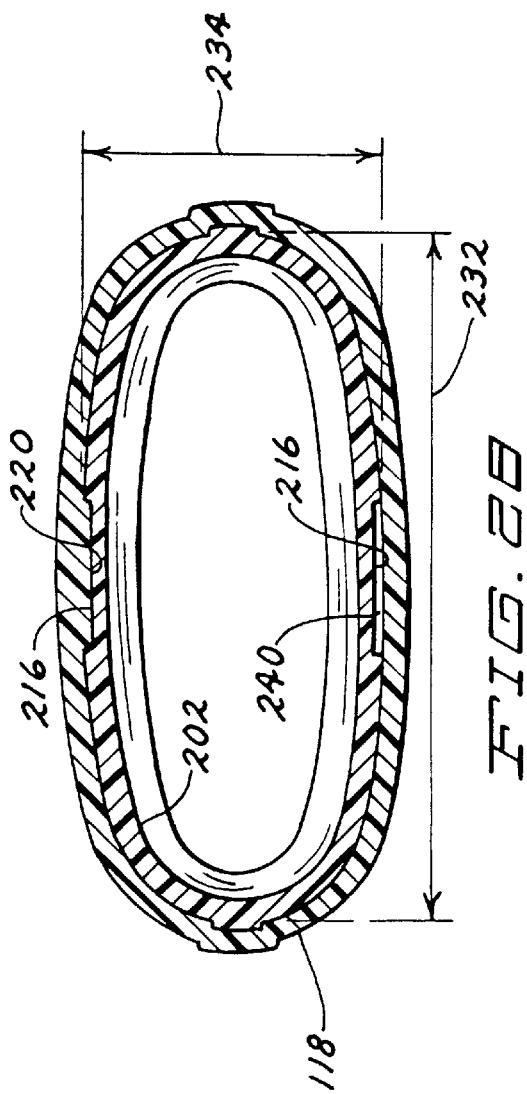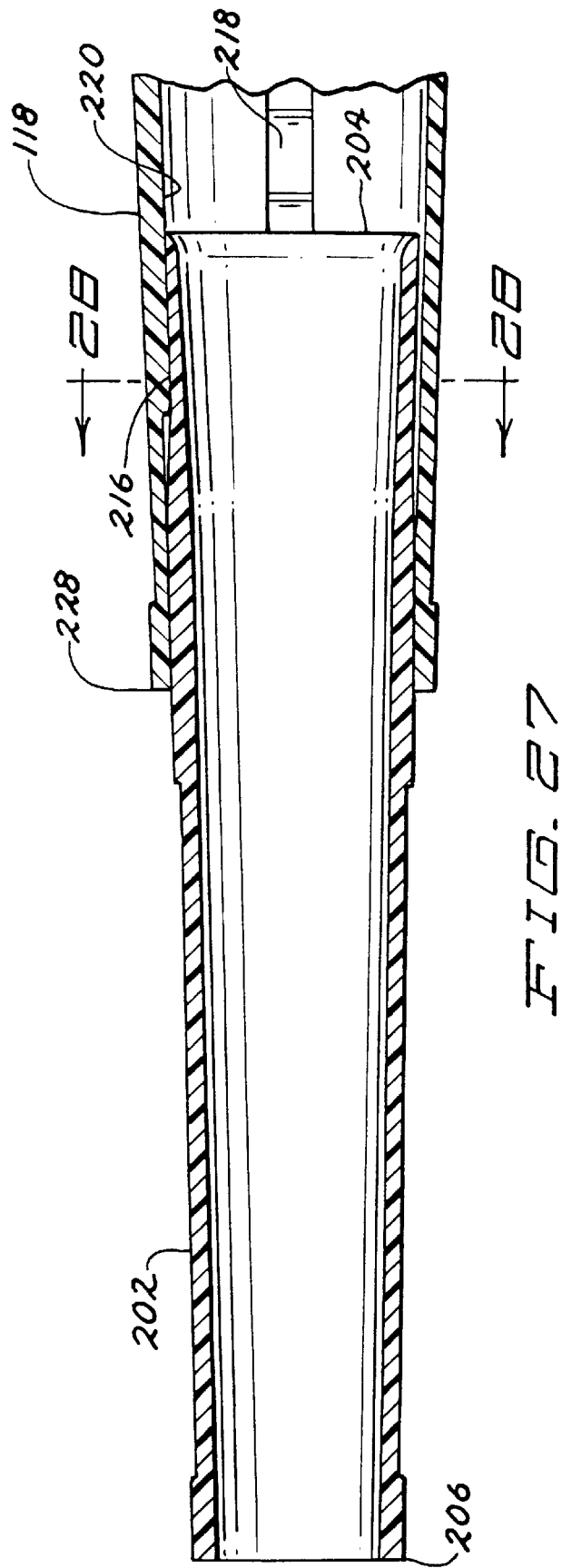

AIR CONCENTRATOR NOZZLE FOR PORTABLE BLOWER

This application is a continuation-in-part of Ser. No. 09/038,365 filed Mar. 10, 1998 and entitled "Air Inlet Cover for Portable Blower/Vacuum."

TECHNICAL FIELD

This invention pertains generally to portable blowers and, more specifically, to air concentrator nozzles for attachment to a portable blower.

BACKGROUND OF THE INVENTION

Portable blowers and portable convertible blower/vacuums (blower/vacs) are in common use by homeowners and professionals for the removal of debris from yards, driveways, and sidewalks. A convertible blower/vac is a device which can be used as a blower or can be converted to operate as a vacuum. While the present invention can be applied to either a blower or a blower/vac, it would apply to the latter only when used in the blower mode.

A typical blower or blowerdvac comprises a housing having a motor operatively connected to an internal, rotating impeller. In blower operation, a sweeping action is created by the production of a fast moving stream of air generated by the rotating impeller. The impeller draws air into the housing through an air inlet. An air inlet cover permits air to enter the housing while at the same time preventing the entrance of foreign objects and debris. An air outlet on the housing directs the air stream to a removable blower or extension tube. The extension tube has an upstream end that connects to the air outlet and a downstream end through which air exits. Typically, the cross-sectional area of the downstream end is less than that of the upstream end. This causes an air stream of higher velocity and pressure at the downstream end, permitting greater precision and force in blowing debris.

Frequently, an air concentrator nozzle is provided that attaches to the downstream end of the extension tube to further reduce the cross-sectional area and, thus, further increase the air stream velocity and pressure. One preferred feature of the air concentrator nozzle is its ability to be easily attached and detached from the extension tube. If connection/removal of the nozzle is difficult or time consuming, operators are less likely to install the nozzle or to remove it once it is installed. By simplifying this procedure, the blower is thereby perceived to be more versatile.

Another desirable feature is that, once attached, the air concentrator nozzle should be positively secured to the extension tube. During use, the downstream end of the tube and the nozzle are often jarred by contact with the ground. Repeated impact of this nature may loosen the nozzle, resulting in air leaks around the nozzle/extension tube interface and perhaps even separation of the nozzle from the tube. To require the operator to frequently re-seat or re-attach the nozzle during use is inconvenient. Thus, securely retaining the nozzle is advantageous.

Cost is also a constant concern with portable blowers and blower/vacs. Accordingly, a nozzle that addresses the issues listed herein must also be economical to produce. Manufacturing complexity, excessive weight and extraneous parts adversely affect blower cost. For this reason, a nozzle that is simple to produce and requires no additional components for attachment is highly desirable.

Many types of blowers utilizing air concentrator nozzles are known. While these nozzles address the primary concern of decreasing the effective cross-sectional area of the extension tube, unresolved issues remain.

For example, U.S. Pat. No. Des. 357,774 issued to Kishi on Apr. 25, 1995 and assigned to Japanic Corp., discloses a concentrator nozzle that appears to attach to the downstream end of the extension tube by a friction fit.

U.S. Pat. No. Des. 297,274 issued to Komiya et al. on Aug. 16, 1988 and assigned to Fuji Robin, discloses a concentrator nozzle that attaches to the downstream end of the extension tube with a clamp-like device (see FIG. 4).

U.S. Pat. No. 5,652,995 issued to Henke et al. and assigned to WCI Outdoor Products, Inc., discloses a nozzle "which has threads . . . at the upstream end of the nozzle . . . for connecting the nozzle to a blower tube." Column 2, lines 2–3.

U.S. Pat. No. 2,586,145 issued to Breuer et al. on Feb. 19, 1952 and assigned to Breuer Electric Manf. Co., discloses a nozzle that attaches to the blower tube by way of a bayonet mount.

U.S. Pat. Nos. 4,553,284 issued to Strumbos on Nov. 19, 1985 and No. 2,068,496 issued to Linghammar and assigned to Electrolux Corp., disclose nozzles for use with vacuum cleaners. In both inventions, the nozzle forms a female receptacle into which the suction tube from the vacuum is then placed.

U.S. Pat. No. 4,746,274 issued to Kiyooka et al. and assigned to 501 Komatsu Zenoah Co., discloses in FIG. 9 an alternative embodiment utilizing a storable blower pipe. The disclosure states that "[t]o use the blower pipe 153, it is pulled out of the storage chamber 150, and the conical surfaces 152 and 154 are engaged tightly with each other." Column 6, lines 25–28.

Finally, U.S. Pat. No. 3,938,218 issued to DeAmicis on Feb. 17, 1976, discloses a pressurized cleaning tool with a telescoping inner tube.

Thus, there are several nozzles know in the art. The present invention pertains to a blower with a novel air concentrator nozzle.

SUMMARY OF THE INVENTION

A portable blower comprising: a housing having an air outlet; an extension tube removably engageable with the air outlet and including an upstream end with an upstream opening and a downstream end with an outlet orifice; and an air concentrator nozzle for insertion into the extension tube, the nozzle including an upstream end and a downstream end. The nozzle may be dropped, downstream end first, into the upstream end of the extension tube, whereby it falls to the downstream end of the extension tube and partially protrudes therefrom. However, it may be retained from further downstream movement by an interference fit relationship with the extension tube.

The upstream end of the extension tube may have a first inner cross-sectional area and the downstream end of the extension tube may have a second inner cross-sectional area which is smaller than the first inner cross-sectional area.

The upstream end of the nozzle may have a first outer cross-sectional area and the downstream end of the nozzle may have a second outer cross-sectional area which is smaller than the first outer cross-sectional area.

The first outer cross-sectional area of the nozzle may be smaller than the first inner cross-sectional area of the extension tube yet larger than the second inner cross-sectional area of the extension tube. Additionally, the second outer cross-sectional area of the nozzle may be smaller than the second inner cross-sectional area of the extension tube.

In another embodiment of the invention, a portable blower with a housing includes: an air outlet; an extension tube removably engageable with the air outlet and having an upstream end with an upstream opening and a downstream end with an outlet orifice; and an air concentrator nozzle. The air concentrator nozzle may further comprise: an upstream end; and a downstream end wherein the latter has a downstream opening having a smaller cross-sectional area than the cross-sectional area of the outlet orifice of the extension tube. In this embodiment, the nozzle, when dropped downstream end first into the upstream end of the extension tube, falls toward the downstream end of the extension tube but is retained from further downstream movement by an interference fit relationship with the extension tube. The nozzle may fall to a point where it protrudes partially and outwardly from the downstream end of the extension tube.

The present invention may also include a method for increasing the exit air velocity capability of a portable blower wherein the blower has: a housing and an air outlet on the housing; an extension tube removably engageable with the air outlet and including an upstream end with an upstream opening and a downstream end with an outlet orifice; and an air concentrator nozzle with an upstream end and a downstream end. The method comprises the steps of: removing the extension tube from the air outlet; inserting the nozzle, downstream end first, into the upstream end of the extension tube; positioning the upstream end of the extension tube above the downstream end of the extension tube, thereby enabling the nozzle to slide to the downstream end of the extension tube such that the nozzle partially protrudes from the downstream end of the extension tube; and attaching the extension tube to the air outlet.

The present invention may also include a method for decreasing the exit air velocity capability of a portable blower comprising the steps of: removing the extension tube from the air outlet, forcing the downstream end of the nozzle toward the upstream end of the extension tube until it dislodges, positioning the upstream end of the extension tube below the downstream end of the extension tube such that the nozzle can be removed from the upstream end of the extension tube, and attaching the extension tube to the air outlet.

Yet another embodiment of the present invention may include a portable blower comprising: a housing including an air outlet; and an extension tube removably engageable with the air outlet and including an upstream end with an upstream opening and a downstream end with an outlet orifice of smaller cross-sectional area than the upstream opening. The blower may additionally comprise an air concentrator nozzle for insertion into the extension tube. The nozzle may include an upstream end with an upstream opening and a downstream end with a downstream opening. The downstream opening may be of smaller cross-sectional area than the cross-sectional area of the outlet orifice. Thus, the nozzle, when dropped downstream end first into the upstream end of the extension tube, may fall to the downstream end of the extension tube, such that the velocity of the air exiting the blower is higher compared to the velocity of the air exiting the blower without the nozzle.

BRIEF DESCRIPTION OF THE DRAWING

This invention will be further described with reference to the appended Drawing, wherein:

FIG. 2A is a bottom plan view of the preferred blower/vac of FIG. 2;

FIG. 11 is a side elevational view of the choke member of FIG. 10;

FIG. 12 is a side elevational view of the choke member of FIG. 10;

FIG. 13 is a cross-sectional view of the choke member of FIG. 11 with some features omitted for clarity;

FIG. 14 is a perspective view of the interior or upper side of the choke member of FIG. 10;

FIG. 25 is an enlarged sectional view of the extension tube, taken generally along line 25—25 of FIG. 21;

FIG. 26 is an enlarged sectional view of the extension tube taken generally along line 26—26 of FIG. 21;

FIG. 27 is an enlarged sectional view of the extension tube and nozzle of FIG. 20, taken generally along line 27—27 of FIG. 20;

FIG. 28 is an enlarged sectional view of the extension tube and nozzle of FIG. 27, taken generally along line 28—28 of FIG. 27;

FIG. 30 is a perspective view of the nozzle showing the nozzle upstream opening.

DETAILED DESCRIPTION OF THE PREFERRED EMBODIMENT

Figure 1:
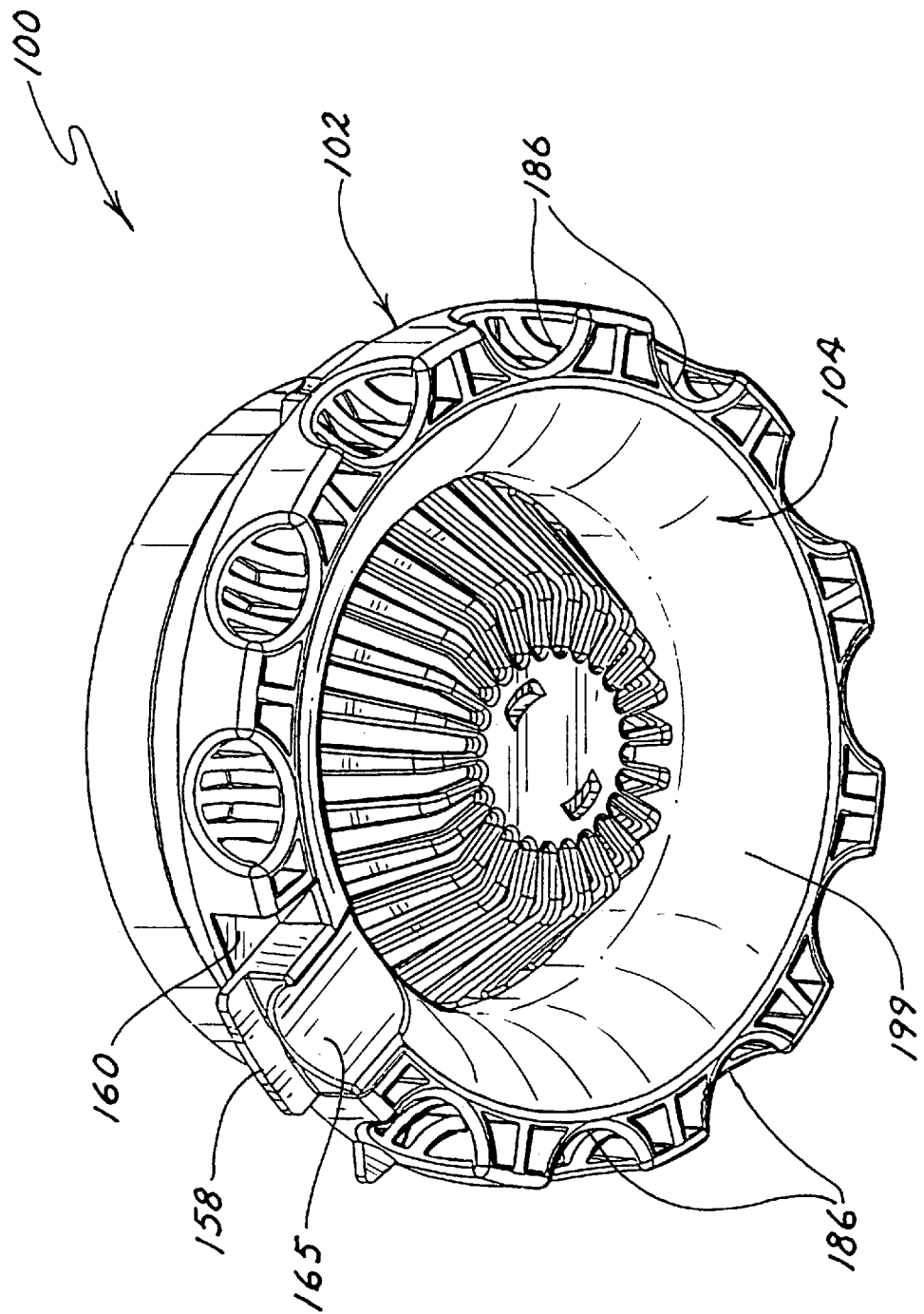
FIG. 1 is a perspective view of the exterior or air entrance side of the preferred air inlet cover of the present invention.

With reference to the Drawing, wherein like reference numerals designate like parts and assemblies throughout the several views, FIG. 1 shows a perspective view of a preferred air inlet cover 100 for use with a portable blower/vacuum. Cover 100 includes an air inlet grate 102 and a choke member 104. While the cover of the present invention is directed to electric blower/vacs, those skilled in the art will appreciate that it could be applied to other types of blower/vacs as well (e.g., gas engine-powered units, blower-only units, backpack-mounted units). In the preferred embodiment, cover 100 is removable. However, a blower/vac or blower-only unit with a non-removable cover is also within the scope of the present invention.

Figure 2:
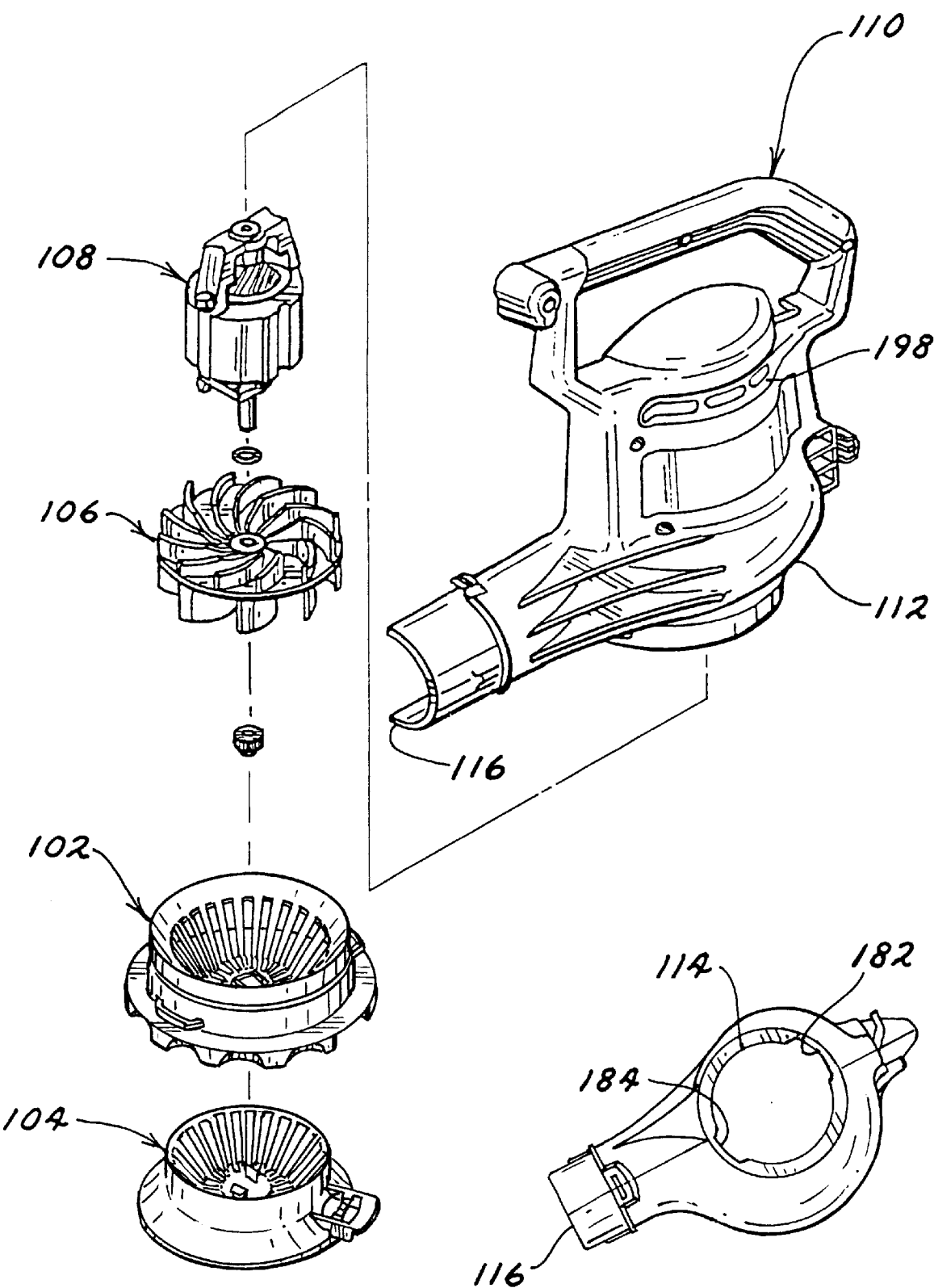
FIG. 2 is an exploded view of a preferred blower/vac assembly including the air inlet grate and choke member of the cover of FIG. 1.

Although the particular construction of the blower/vac is, for the most part, not central to the invention, the basic components will be described. Unless otherwise noted, relative directions (e.g., upward, downward) refer to the orientation of the particular part or assembly in its installed position. FIG. 2 shows an exploded view of an electric blower/vacuum 110. Blower/vac 110 comprises a housing 112 (left half shown) having an air inlet opening 114 (see FIG. 2A). In the preferred embodiment, an electric motor 108 is mounted within an interior region of housing 112. However, those skilled in the art will realize that housing 112 could easily be modified to alternatively accept an internal combustion engine. A motor output shaft extends downwardly from motor 108 in a direction that is generally perpendicular to the plane of air inlet opening 114. Operatively connected to the output shaft is an impeller 106. Impeller 106 is secured to the output shaft such that relative rotation between the impeller and the shaft is eliminated. Housing 112 additionally includes an air outlet 116. Air inlet opening 114 resides in a first plane while outlet 116 lies in a second plane that is substantially perpendicular to the first plane.

In order to receive electricity, a male electrical cord connector (not shown) protrudes outwardly from housing 112. The connector can be coupled to an extension cord (not shown) that conducts electricity from an electrical outlet (also not shown) through an electrical circuit to electric motor 108. An electrical switch (not shown) mounted to housing 112 is wired in series between motor 108 and the connector. The switch, upon operator command, opens and closes the electrical circuit for the motor. Thus, by operator manipulation of the switch, the blower/vac 110 can be selectively activated.

Figure 3:
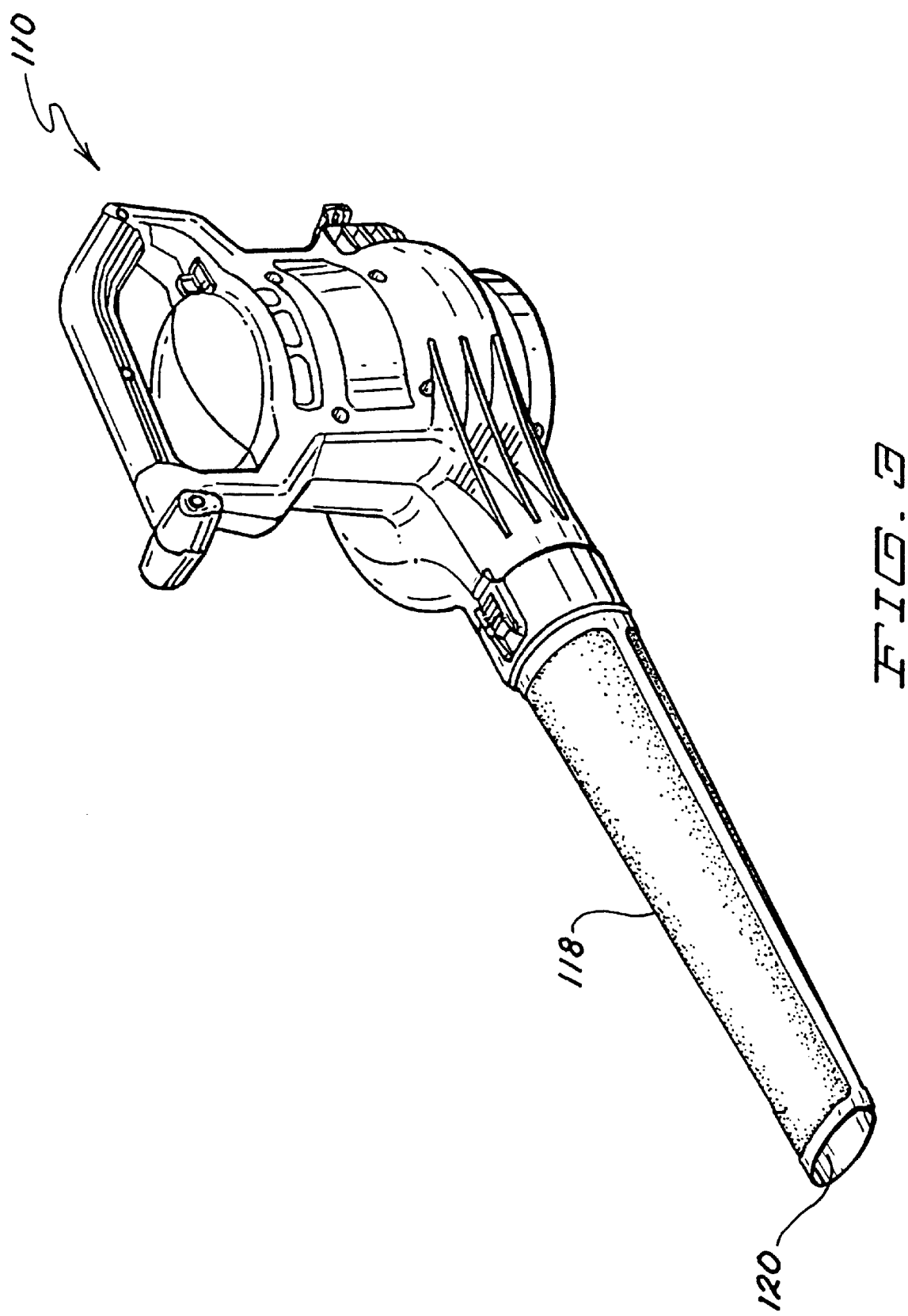
FIG. 3 is a perspective view of the preferred blower/vac configured for operation in the blower mode.
Figure 4:
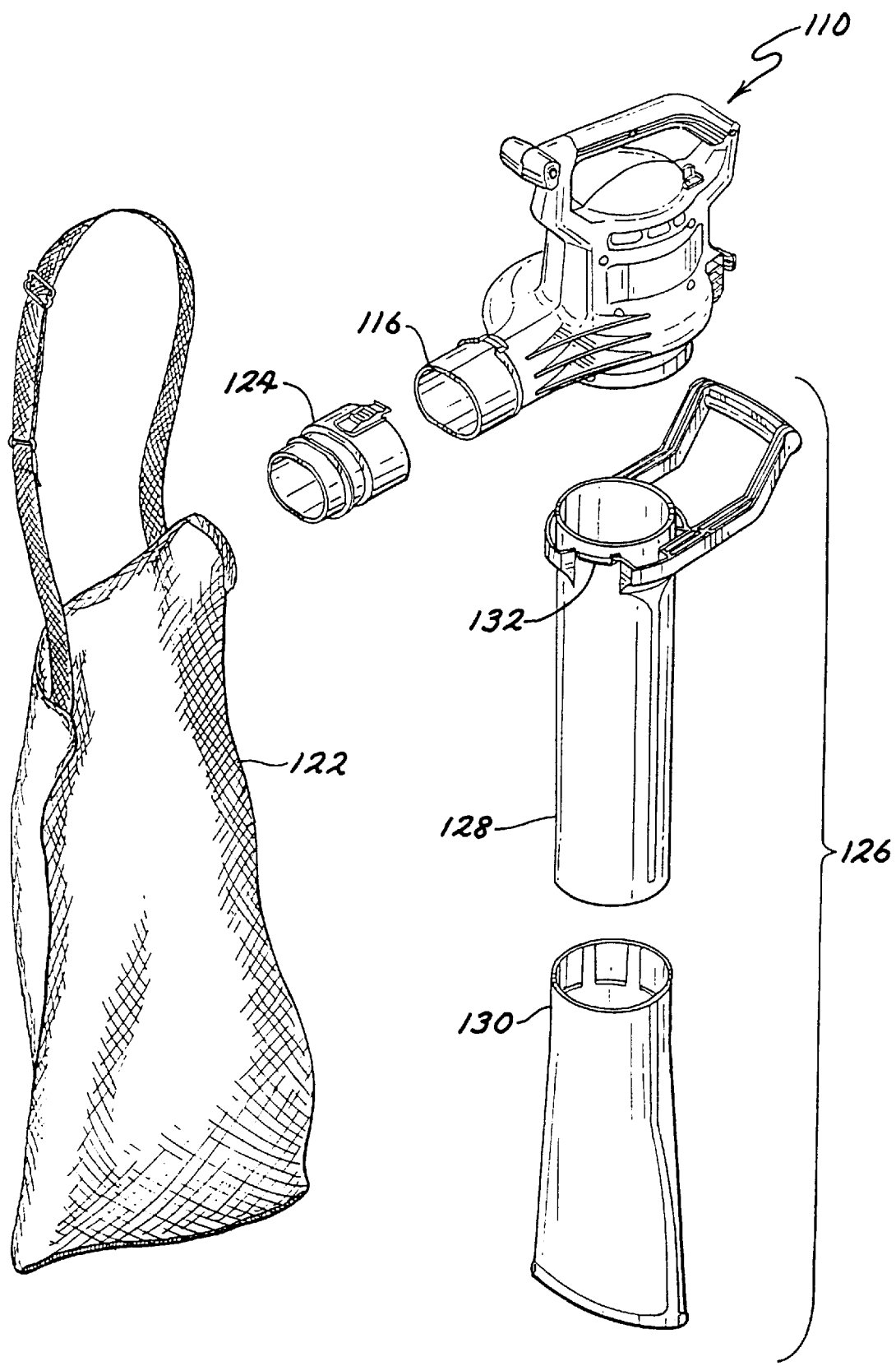
FIG. 4 is an exploded view of the preferred blower/vac configured for operation in the vacuum mode.

The blower/vac can operate in either a blower mode or a vacuum mode. When operating in the blower mode, blower/vac 110 is configured as shown in FIG. 3. That is, an outlet extension tube 118 having an outlet orifice 120 is attached to air outlet 116. When operated in vacuum mode, blower/vac 110 is configured as shown in FIG. 4. In this mode, a vacuum collection bag 122 is attached to air outlet 116 via a vacuum bag collar 124. A vacuum tube assembly 126 is then attached to air inlet opening 114 (see FIG. 2A). Vacuum tube assembly 126 comprises an upper tube 128 and a lower tube 130. Upper tube 128 includes a set of engagement members 132 for operatively engaging vacuum tube assembly 126 to blower inlet 114. Lower tube 130 may be flared to provide more effective vacuum action. When blower/vac 110 is used in vacuum mode, cover 100 is completely removed from air inlet opening 114 so that vacuum tube assembly 126 may be installed (i.e., the air inlet cover of the present invention is used only when blower/vac 110 is operating in the blower mode). Accordingly, the remainder of this discussion will focus primarily on the operation of blower/vac 110 in the blower mode.

The preferred embodiment of cover 100 shown in FIG. 1 is adapted to be removably mounted over air inlet opening 114. The primary purpose of the cover is to allow air to pass into housing 112 while preventing foreign objects (e.g., debris, fingers) from contacting rotating impeller 106. Other advantages of the preferred air inlet cover include: a safety feature which prevents activation of electric motor 108 when cover 100 is not installed; means for adjusting the effective area of inlet opening 114; and, integral means for increasing the efficiency of the blower/vac when it is operated in the blower mode. Each of these features is discussed below.

Figure 5:
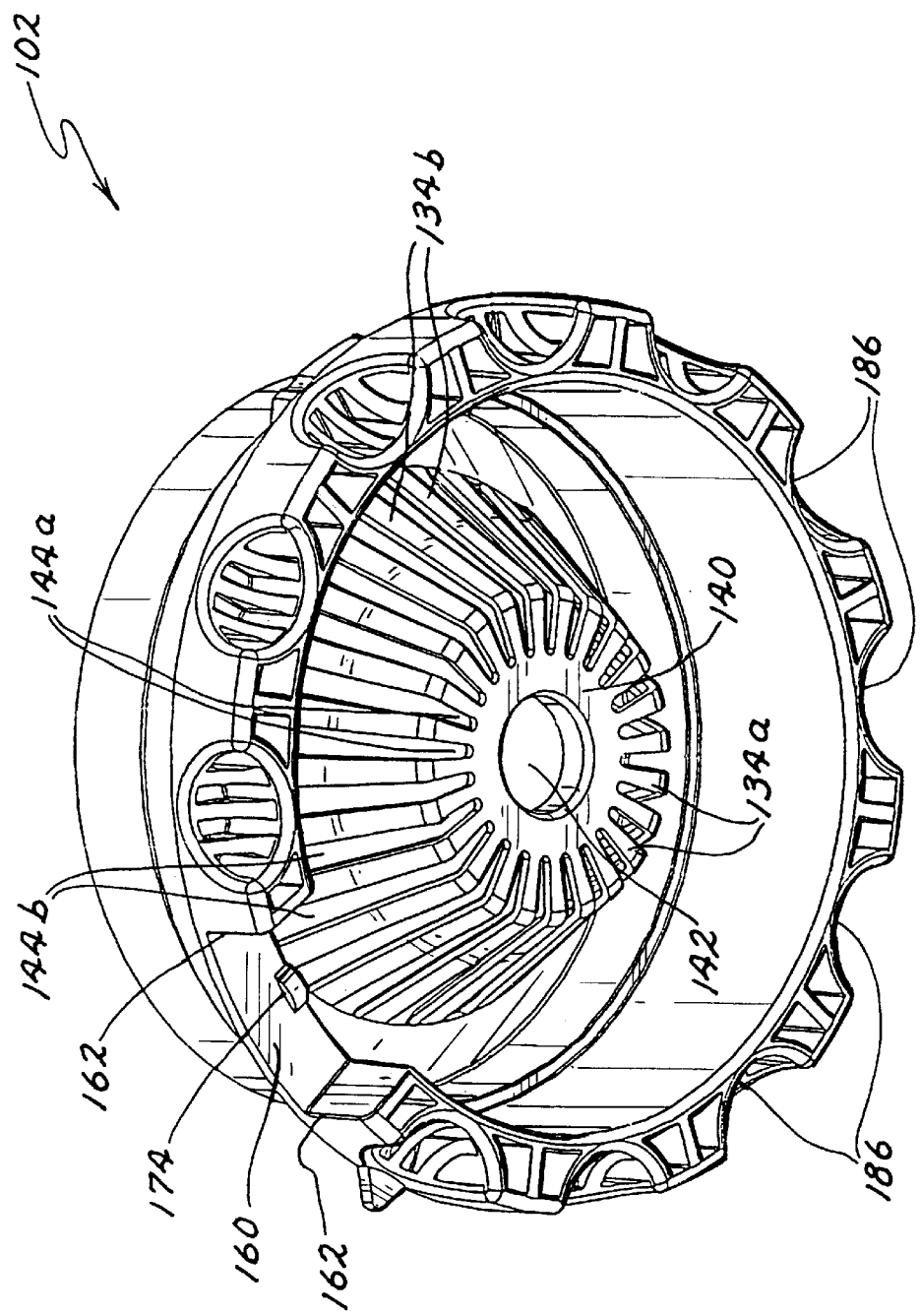
FIG. 5 is a perspective view of the exterior or air entrance side of the air inlet grate of the air inlet cover of FIG. 1.
Figure 6:
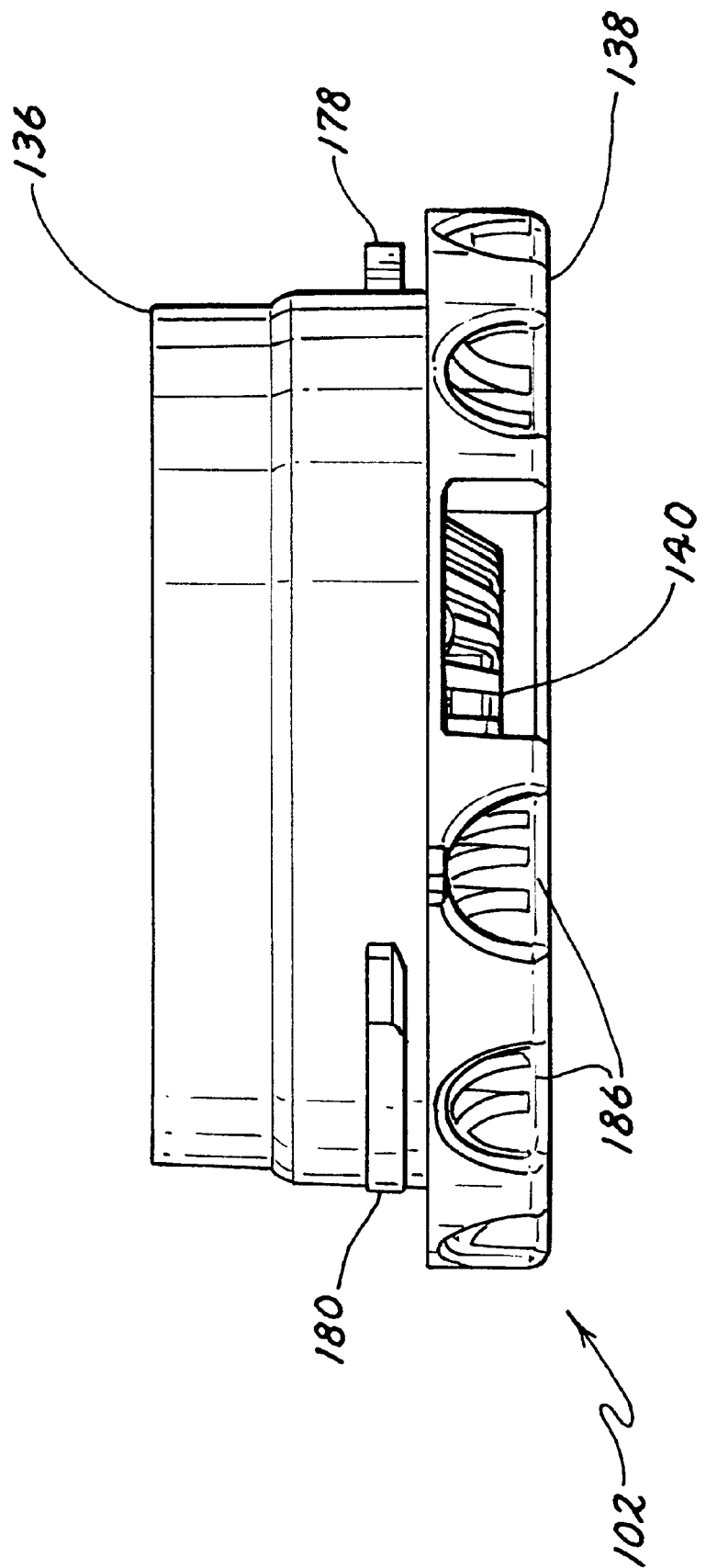
FIG. 6 is a side elevational view of the air inlet grate of FIG. 5.
Figure 7:
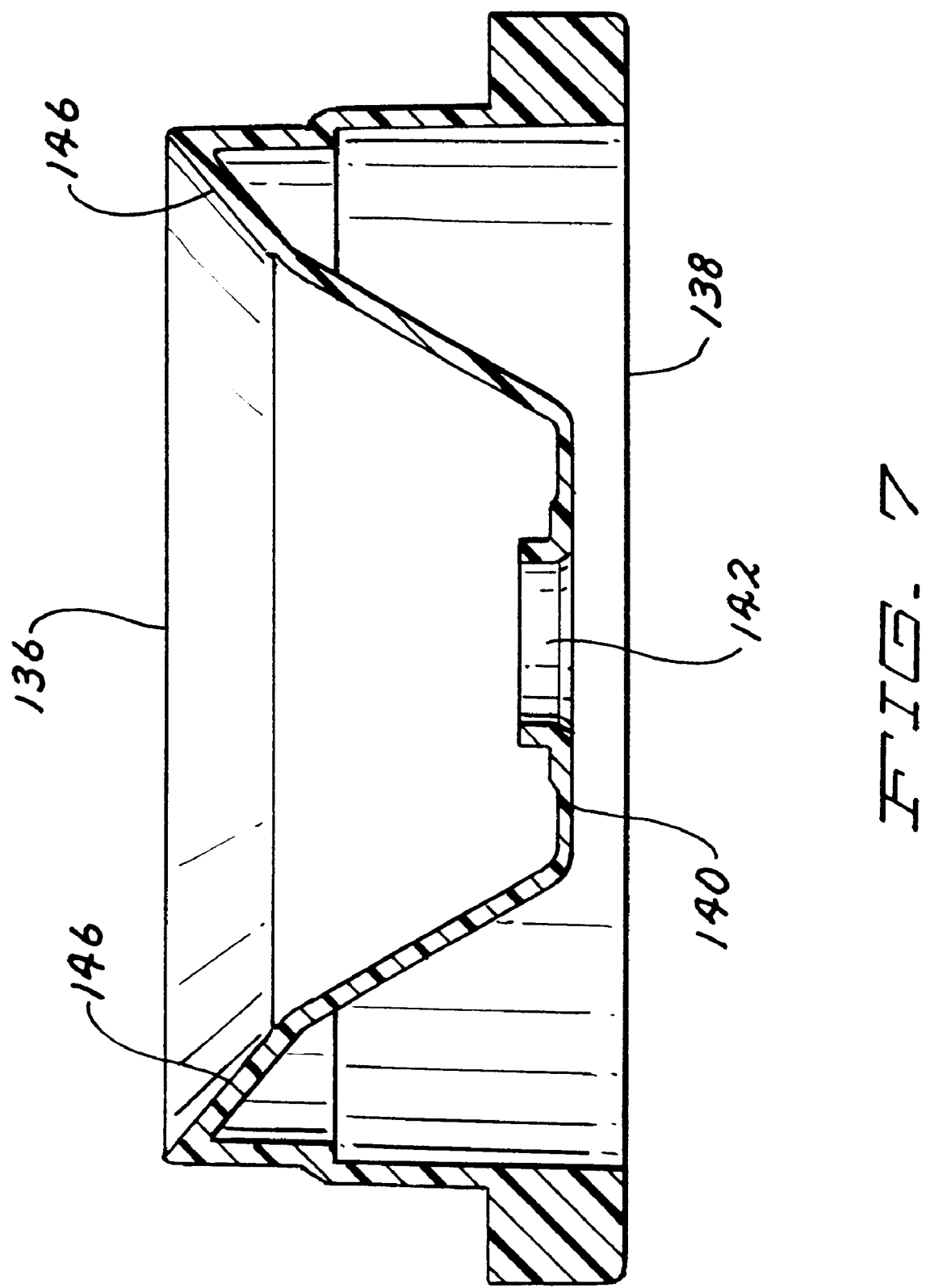
FIG. 7 is a cross-sectional view of the air inlet grate of FIG. 5 with some features omitted for clarity.

Referring to FIGS. 5–9, air inlet grate 102 includes a series of spokes 134 defining the grate. The air grate allows the passage of air through cover 100 while at the same time providing a barrier to passage of objects that may contact the rotating impeller 106. Referring to FIG. 6, inlet grate 102 includes an exterior or air entrance side 138 through which air enters the cover and an interior or air exit side 136 through which air exits the cover as it enters blower housing 112. As best viewed in FIGS. 5 and 7, a central hub 140 is centrally located proximal to exterior side 138 in a plane generally parallel thereto. A series of radially disposed grate spokes 134a extend away from a hub opening 142 located at the center of central hub 140. Grate spokes 134a define a series of radially disposed grate orifices 144a that are interposed between the radially disposed grate spokes. A second series of grate spokes 134b extend generally outwardly and away from radially disposed grate spokes 134a. Grate spokes 134b, in the preferred embodiment, are actually extensions of radially disposed grate spokes 134a since air inlet grate 102 is an integrally molded plastic component. Grate spokes 134b define a series of grate orifices 144b that are interposed between grate spokes 134b. As shown in FIG. 7, Grate spokes 134b—at their upper end—terminate and partially support a pressure ring 146. Grate spokes 134a and 134b define a frusto-conical surface that is best viewed in FIG. 7. The frustum is bound by central hub 140 and pressure ring 146.

Figure 16:
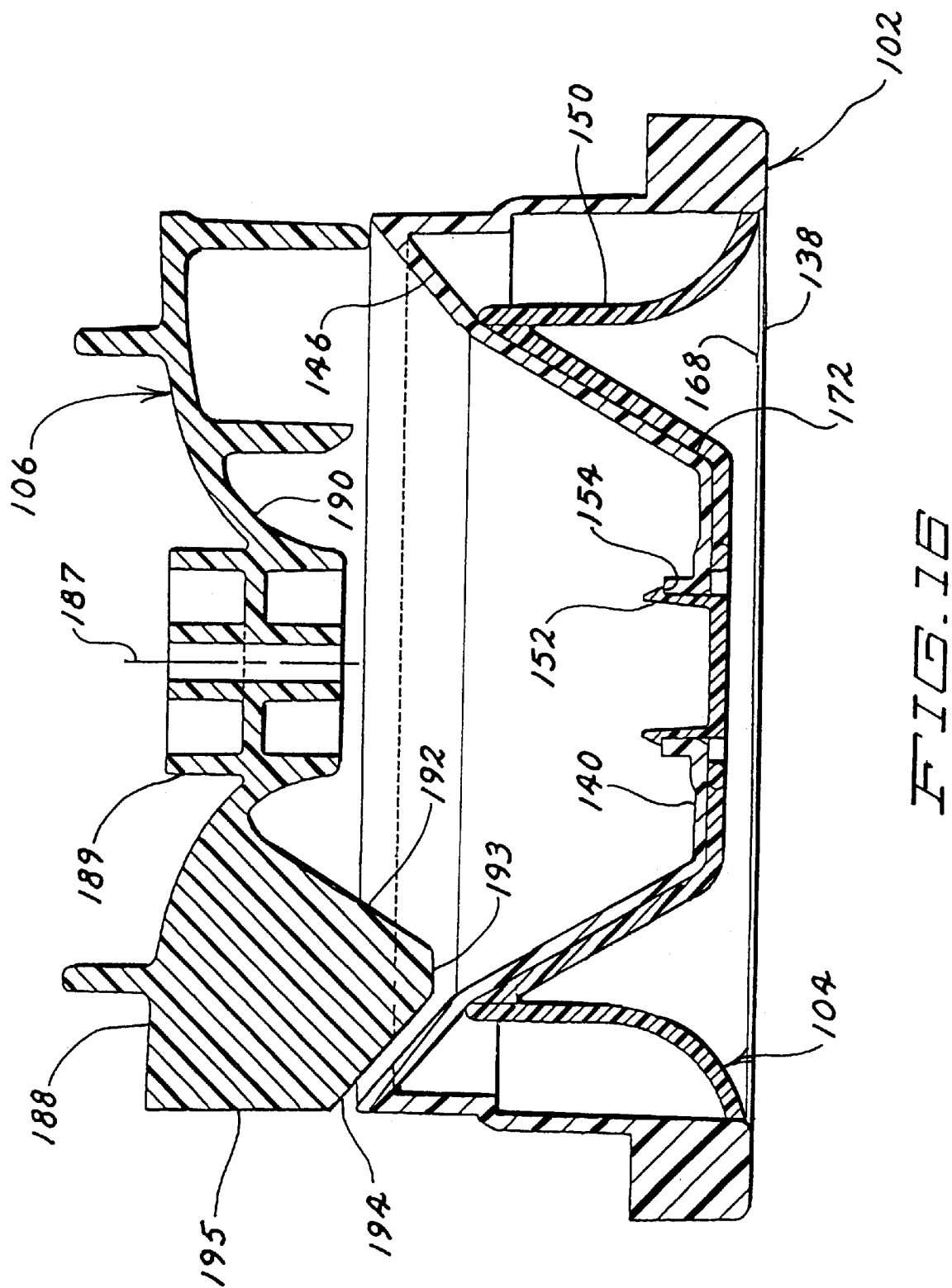
FIG. 16 is a cross-sectional view of the preferred air inlet cover of FIG. 1 showing the impeller with some features omitted for clarity.

In the preferred embodiment, pressure ring 146 also forms a frusto-conical surface, a feature best viewed in FIGS. 7 and 16. The purpose of pressure ring 146 is to increase the efficiency of impeller 106 when air inlet grate 102 is engaged over air inlet opening 114 (i.e., when cover 100 is installed). When air inlet grate 102 is correctly installed, pressure ring 146 is positioned immediately adjacent to impeller 106 as shown in FIG. 16. When impeller 106 is rotating, it draws air through air grate 102 and air inlet 114 and expels it through air outlet 116. The close proximity of impeller 106 to pressure ring 146 reduces the amount of air that leaks or "spills over" from the high pressure side of the impeller blades to the low pressure side. By reducing the spillover of air, the efficiency of impeller 106 is increased. That is, by reducing spillover, the output air horsepower of blower/vac 110 is increased for a given motor (shaft) horsepower. Without pressure ring 146, impeller 106 would spill more air axially rather than discharging it radially as desired.

Figure 19:
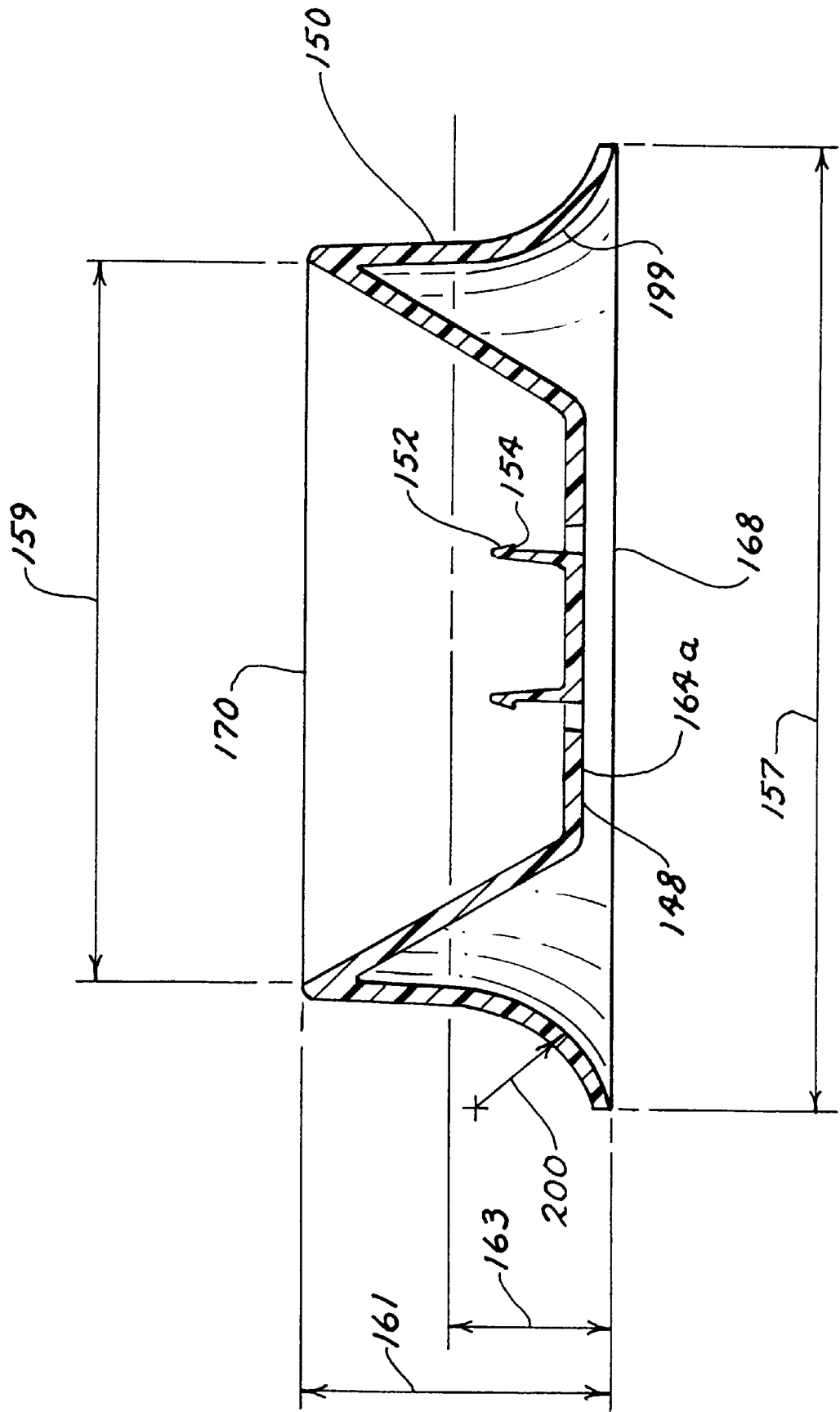
FIG. 19 is a side view of the impeller of FIG. 17.
Figure 18:
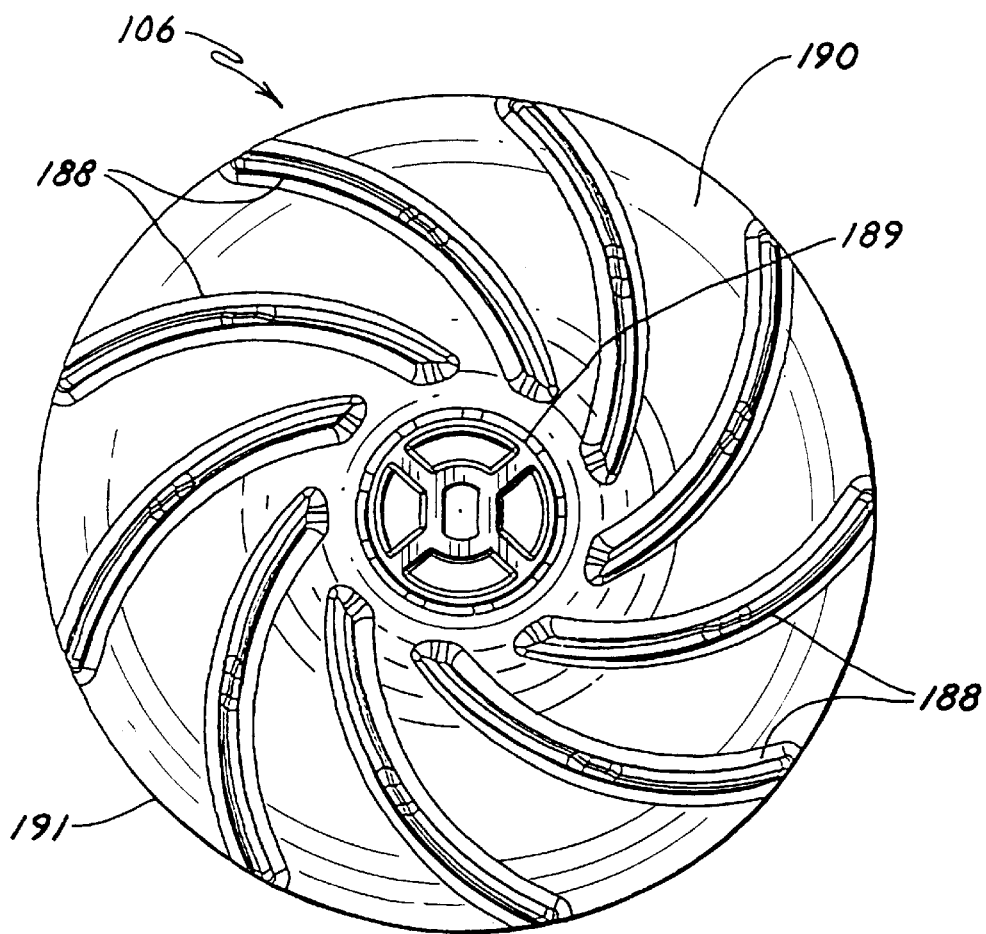
FIG. 18 is a bottom plan view of the impeller of FIG. 17.

Referring now to FIGS. 16, 18 and 19, impeller 106 comprises a hub 189 and a base 190. A perimeter 191 defines the outer edge of base 190. During operation, impeller 106 rotates about an axis of rotation 187 which is coaxial with the output shaft of motor 108. On the lower side of the impeller, extending downwardly in a generally perpendicular direction from base 190, is a plurality of integral, main impeller blades 188. Each main impeller blade 188 has a linear inner edge 192 which extends generally downwardly and away from a region near the junction of hub 189 and base 190 to a distal point. Each main impeller blade also has an outer edge 194 which extends generally upwardly and away from an innermost point, which is proximal to the distal point of inner edge 192, to an outermost point. In the preferred embodiment, an intermediate middle edge 193 terminates at the distal point of edge 192 and the innermost point of edge 194. Middle edge 193 lies in a plane that is generally perpendicular to axis of rotation 187. Each blade 188 includes a vertical edge 195 that extends downwardly from perimeter 191 to the outermost point of outer edge 194. As FIG. 18 demonstrates, each main impeller blade 188 radiates outwardly from the region near the junction of hub 189 and base 190 to perimeter 191 in a curvilinear manner.

As shown in FIG. 19, outer edge 194 is slightly convex in shape. In the context of FIG. 16 (i.e., as installed), outer edges 194 of main impeller blades 188 define a generally frusto-conical surface of revolution that is slightly offset but congruent to the frusto-conical surface defined by pressure ring 146. In the preferred embodiment, the nominal offset between fixed pressure ring 146 and rotating main impeller blades 188 is approximately 0.070 inches. This minimal offset improves the efficiency of the blower by reducing spillover as discussed above. In effect, impeller 106 is "sealed" to pressure ring 146.

Figure 17:
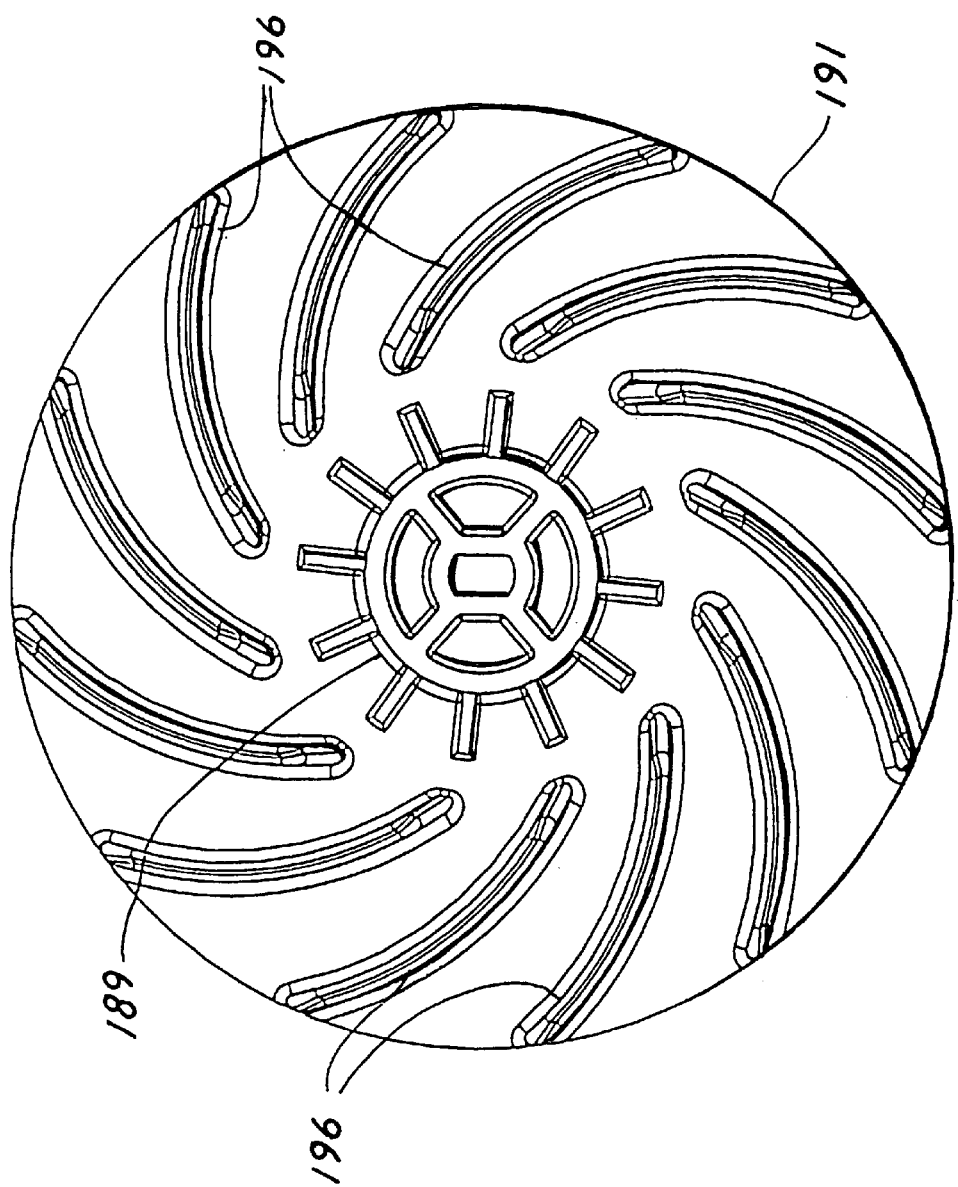
FIG. 17 is a top plan view of the impeller of the present invention with some features omitted for clarity.
Figure 19:
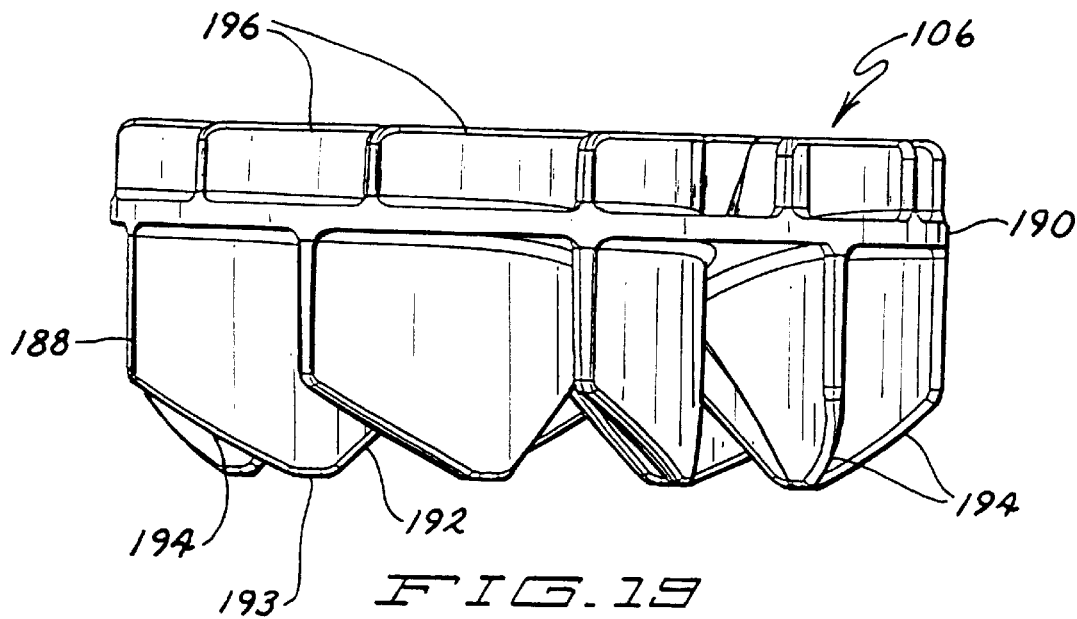

As shown in FIGS. 17 and 19, impeller 106 additionally includes a plurality of cooling impeller blades 196 located opposite main impeller blades 188. Blades 196 are similar to main impeller blades 188 in that, in a plan view, each cooling impeller blade 188 radiates outwardly to perimeter 191 in a curvilinear manner as shown in FIG. 17. Additionally, cooling impeller blades 196, like main impeller blades 188, also draw air into housing 112 and discharge it through air outlet 116. However, the cooling impeller blades draw air into housing 112 through a series of cooling vents 198 (shown in FIG. 2). Air drawn through cooling vents 198 then passes through a cavity (not shown) surrounding electric motor 108 before exiting through air outlet 116. Thus, cooling impeller blades 196 ensure continual cooling of electric motor 108 during operation of blower/vac 110. In the preferred embodiment, there are nine main impeller blades and twelve cooling impeller blades.

Figure 10:
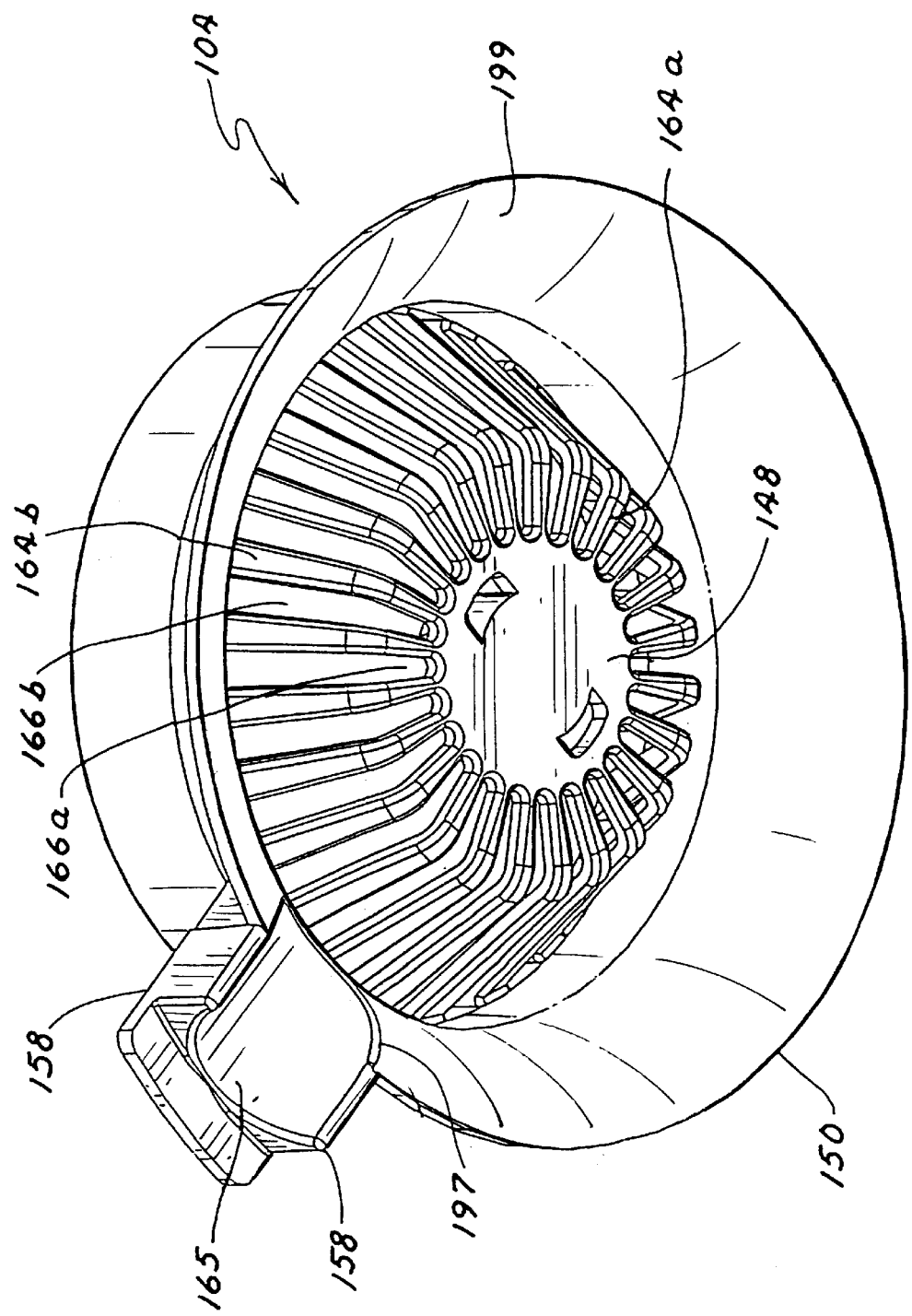
FIG. 10 is a perspective view of the exterior or lower side of the choke member of the air inlet cover of FIG. 1.

Adjustable choke member 104 is adapted to "snap-fit" over air inlet grate 102. The choke member is shown in FIGS. 10–15. Referring particularly to FIG. 10, choke member 104 includes a hub region 148, a perimeter region 150, and an intermediate spoke region. For descriptive purposes, an exterior or "lower" side 168 is defined as shown in FIG. 12. An interior or "upper" side 170 is opposite thereto. Two clips 152 extend perpendicularly from hub region 148 as shown in FIGS. 13 and 14. Clips 152 include raised portions 154 at their distal ends. Clips 152 are spaced angularly apart from one another by 180 degrees. Clips 152 are also spaced radially from the center of hub 148 such that they may be inserted into the hub opening 142 of air inlet grate 102. Raised portions 154 engage a lip 156 (visible in FIGS. 7 and 8) on the interior side of hub opening 142, thus retaining choke member 104 axially relative to grate 102 (see FIGS. 7 and 8).

A choke lever 158 extends radially from choke member 104 as shown in FIGS. 10, 11, 12, 14, and 15. When choke member 104 is secured to air inlet grate 102 as described above, choke lever 158 nests within a choke lever opening 160 on air inlet grate 102 as shown in FIG. 1. Choke lever opening 160 is sized such that choke lever 158 can move back and forth between a pair of walls 162 as shown in FIG. 5. This back and forth movement permits choke member 104 to be pivotally rotated about hub opening 142 of air inlet grate 102. Choke lever 158 extends slightly beyond inlet grate 102 so that an adequate lever arm is provided for pivoting choke member 104. In the preferred embodiment, the total pivotal movement of choke member 104 is approximately 5 to 10 degrees.

Referring generally to FIG. 10, choke member 104 includes a series of radially disposed choke spokes 164a extending away from hub region 148. These spokes define a series of radially disposed choke orifices 166a interposed between radially disposed choke spokes 164a. A second series of choke spokes 164b extend generally upwardly and away from radially disposed choke spokes 164a. Choke spokes 164b are, in the preferred embodiment, actually extensions of the radially disposed choke spokes 164a since choke member 104 is an integrally molded element. Choke spokes 164b define a series of choke orifices 166b interposed between choke spokes 164b. Choke spokes 164a and 164b define a generally frusto-conical surface that is best viewed in FIG. 13. The frustum of this conical surface is bound by hub region 148 and side 170.

In order for choke member 104 to pivotally rotate about hub opening 142 of air inlet grate 102, the preferred cover is manufactured to provide a minimal positive clearance 172 between the choke and grate when assembled as shown in FIG. 16. Clearance 172 is exaggerated in FIG. 16 for descriptive purposes. In reality, choke hub region 148 and choke spokes 164 may be in contact with grate central hub 140 and grate spokes 134 respectively. However, any interference or resulting friction between the respective parts is not of sufficient magnitude to prevent rotation of choke member about hub opening 142. Choke member 104 is designed such that, when it is secured to air inlet grate 102, choke spokes 164b and choke orifices 166b are generally equal in length to grate spokes 134b and grate orifices 144b respectively. Similarly, radially disposed choke spokes 164a and radially disposed choke orifices 166a closely overlie radially disposed grate spokes 134a and radially disposed grate orifices 144a respectively. This relatively close fit of choke member 104 and its spokes and orifices in relation to the spokes and orifices of inlet grate 102 allows the operator to substantially block air inlet grate 102 when desired.

Once choke member 104 is secured to the air inlet cover, the choke member can be pivoted back and forth about hub opening 142. Referring to FIGS. 5 and 10, when choke member 104 is pivoted selectively to a first position, radially disposed choke spokes 164a obstruct the radially disposed grate orifices 144a, and choke spokes 164b obstruct grate orifices 144b. In this first position with the grate orifices generally obstructed by the choke spokes, the inlet area of cover 100 is substantially reduced. However, impeller blades 196 continue to draw air through cooling vents 198 as previously discussed. Nevertheless, the volume of air entering blower/vac 110 is substantially diminished. This reduction creates a corresponding decrease in the velocity and volume of the air stream exiting blower/vac 100 at air outlet 116.

When choke member 105 is pivoted to a second position opposite the first position, the radially disposed choke spokes 164a move away from the radially disposed grate orifices 144a, thus exposing radially disposed grate orifices 144a for passage of air through cover 100. Also, the movement of choke member 104 to the second position moves choke spokes 164b away from grate orifices 144b, thus exposing grate orifices 144b for passage of air through cover 100. Thus, in the second position, grate orifices 144 are aligned with choke orifices 166. With choke member 104 in its second position, the intake area of cover 100 is increased (i.e., the airflow through blower/vac 110 is maximized).

A detent protrusion 174 (shown in FIG. 5) is centrally located in choke lever opening 160 between the choke lever opening walls 162. Mating detent cavities 176 located on the upper side of the choke lever 158, as shown in FIG. 14, communicate with detent protrusion 174 such that choke member 104 is held in the first or second position and can only be moved out of position by a moderate amount of force. Accordingly, detent protrusion 174 and detent cavities 176 prevent inadvertent movement of choke lever 158 (and thus choke member 104) from its set position relative to air inlet grate 102.

Figure 8:
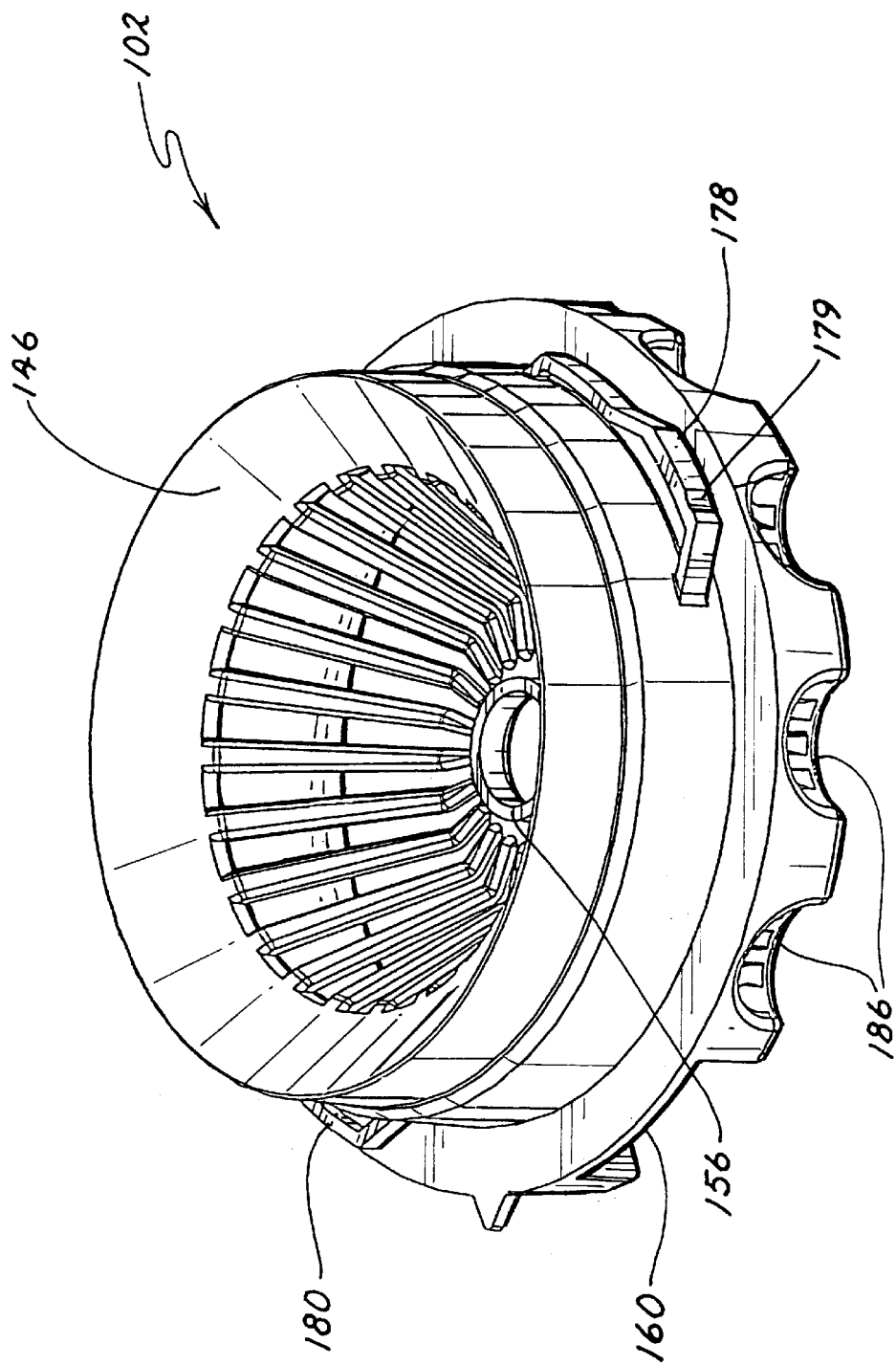
FIG. 8 is a perspective view of the interior or air exit side of the air inlet grate of FIG. 5.
Figure 9:
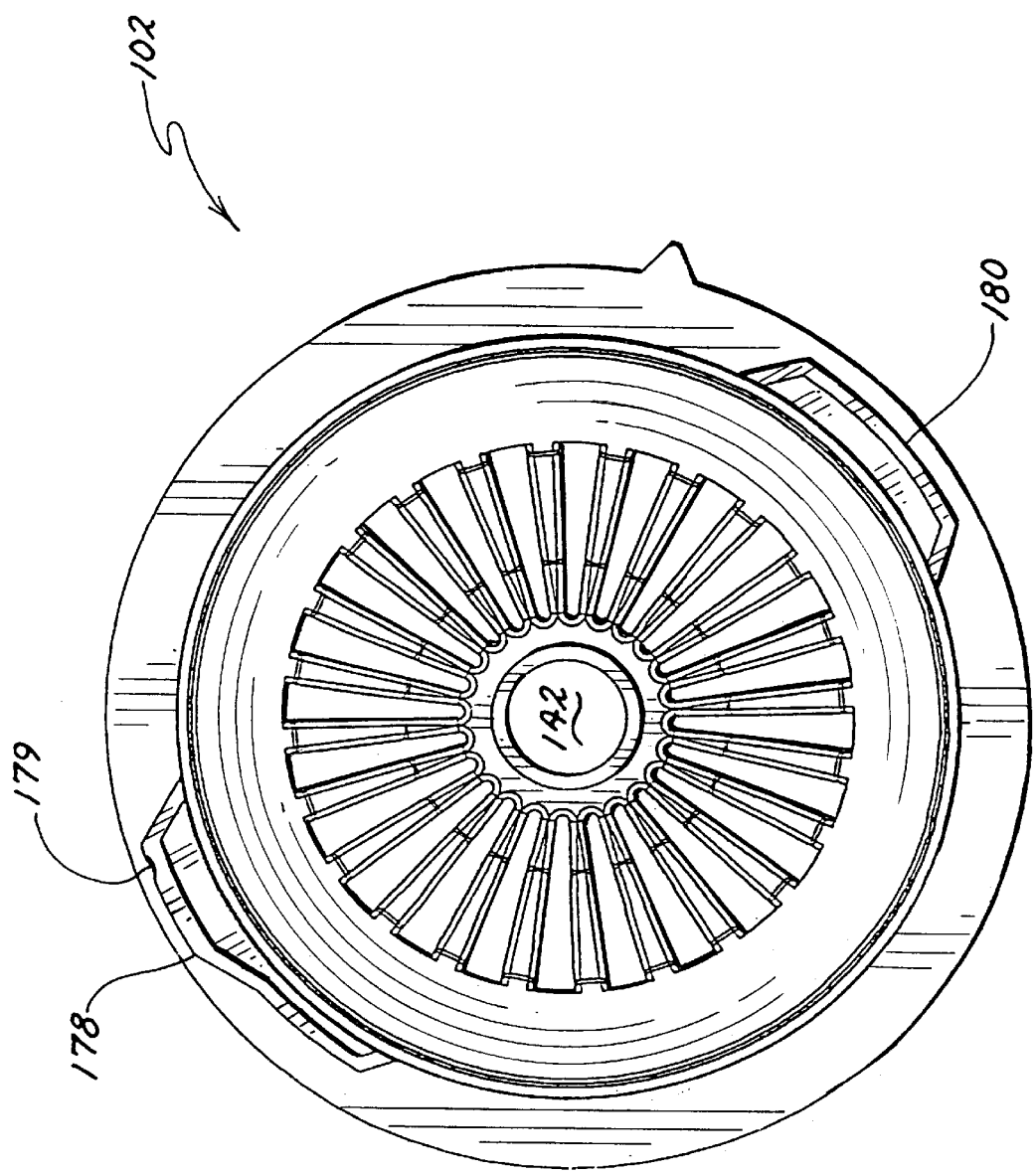
FIG. 9 is a plan view of the air inlet grate of FIG. 5.

A pair of male engagement members 178 and 180, visible in FIGS. 8 and 9, allow cover 100 to be removably engaged to air inlet opening 114. Male engagement members 178 and 180 are located approximately 180 degrees from one another on the perimeter of air inlet grate 102. As can be seen in FIG. 9, male engagement members 178 and 180 are different from one another. A pair of corresponding slots 182 and 184 in housing 112 are positioned at air inlet opening 114 and are best shown in FIG. 2A. Slot 182 is sized so as to accept only male engagement member 178. Slot 184 is sized so as to accept only male engagement member 180. Thus, air inlet cover 100 can only engage air inlet opening 114 in one orientation. In the preferred embodiment, air inlet cover 100 is engaged over air inlet opening 114 such that choke lever 158 is positioned to the left side (when viewed from above the blower) of blower/vac housing 112.

The safety interlock switch (not shown) is mounted in housing 112 at the rear of air inlet opening 114 proximal to slot 182. The safety interlock switch includes an actuator (not shown) that protrudes into the area immediately adjacent to slot 182. When air inlet cover 100 is engaged over air inlet opening 114, male engagement member 178 engages and depresses the actuator and closes the contacts in the switch. When cover 100 is removed from air inlet opening 114, male engagement member 178 moves away from the actuator. The biasing force of the actuator causes it to extend from its depressed position. When the actuator is extended, the contacts of the safety interlock switch are opened. The safety interlock switch is connected in series to the electrical on-off switch. Electric blower/vac motor 108 cannot be energized unless the contacts of the safety switch and the on-off switch are closed. Thus, if cover 100 is removed, the interlock switch contacts are open and the motor 108 cannot be energized even if the on-off switch contacts are closed.

Referring specifically to FIGS. 1 and 5, air inlet cover 100 also includes a series of quarter spherical indentations 186 spaced around the lower perimeter of the grate 102. In the preferred embodiment, a total of eleven quarter spherical indentations are spaced at 30 degree intervals about either side of choke lever opening 160. Quarter spherical indentations 186 are designed to comfortably accommodate the operator's fingers when grasping cover 100 to engage it over air inlet 114 or when removing it therefrom.

Now referring to FIGS. 2A, 8 and 9, Cover 100 (comprising both grate 102 and choke member 104) is retained over air inlet opening 114 as follows. Cover 100 is aligned with slots 182 and 184 so that the male engagement members 178 and 180 are aligned with the matching slots. Then cover 100 is pushed into air inlet opening 114 so that engagement members 178 and 180 pass through respective slots 182 and 184. When male engagement members 178 and 180 clear slots 182 and 184, cover 100 can then be rotated in a clockwise (looking at the cover from the bottom of the blower/vac) direction until a detent lock 179 (best shown in FIG. 8) rotationally retains cover 100 by engaging the biased actuator of the safety interlock switch (not shown). The locking force exerted by the detent system keeps cover 100 from unwanted rotation. However, the locking force can be overcome by a moderate rotational force exerted by the operator. Thus, when the operator chooses to remove cover 100, he simply needs to grasp quarter spherical indentations 186 and rotate it counterclockwise until the detent retention force is overcome. Once the detent retention force is overcome, cover 100 can be further rotated until the male engagement members 178 and 180 are aligned with slots 182 and 184. At that point, cover 100 can be pulled axially away from air inlet opening 114 and removed from housing 112. It should be noted that when operated in vacuum mode, vacuum tube engagement members 132 on the upper end of upper tube 128 (see FIG. 4) engage air inlet opening 114 in a similar manner.

During use in the blower mode, air is drawn into blower housing 112 through air inlet cover 100 at air inlet opening 114. In order to maximize blower efficiency, optimal air flow into opening 114 is necessary. Thus, perimeter region 150 of choke member 104 defines a bell-mouthed entrance 199 best viewed in FIGS. 1 and 10. As further discussed below, bell-mouthed entrances are generally regarded to offer improved efficiency as compared to other entry configurations. From FIG. 13, bell-mouthed entrance 199 of the preferred embodiment is formed from the surface of revolution created by a bell-mouthed entrance radius 200 as it is rotated about an axis centrally located and perpendicular to both face 168 and face 170. Although the preferred embodiment incorporates bell-mouthed entrance 199 with movable choke member 104, an air inlet cover omitting the choke member but incorporating the bell-mouthed entrance into the cover itself is also within the scope of the present invention.

The general dimensions of the bell-mouthed entrance will now be described. Referring to FIG. 13, entrance 199 of the preferred embodiment transitions from an opening diameter 157, which measures between 4.5 and 5.0 inches, to a reduced diameter 159, which measures between 3.5 and 4.0 inches. Additionally, choke member 104 has a height 161 of approximately 1.5 inches. A transitional region 163 (i.e., the linear distance over which opening diameter 157 tapers to reduced diameter 159) measures about 0.65 inches. Finally, radius 200—which defines the bell-mouthed shape—measures between 0.5 and 1.0 inches.

The lower side of choke lever 158 comprises a channel 165 best viewed in FIGS. 1, 10, 12, and 15. Channel 165 is designed to provide adequate contact area so that the operator may, with one finger, comfortably move choke member 104 between its first and second position. That is, channel 165 permits the operator to more easily utilize lever 158 as a lever arm to pivot choke member 104.

Figure 15:
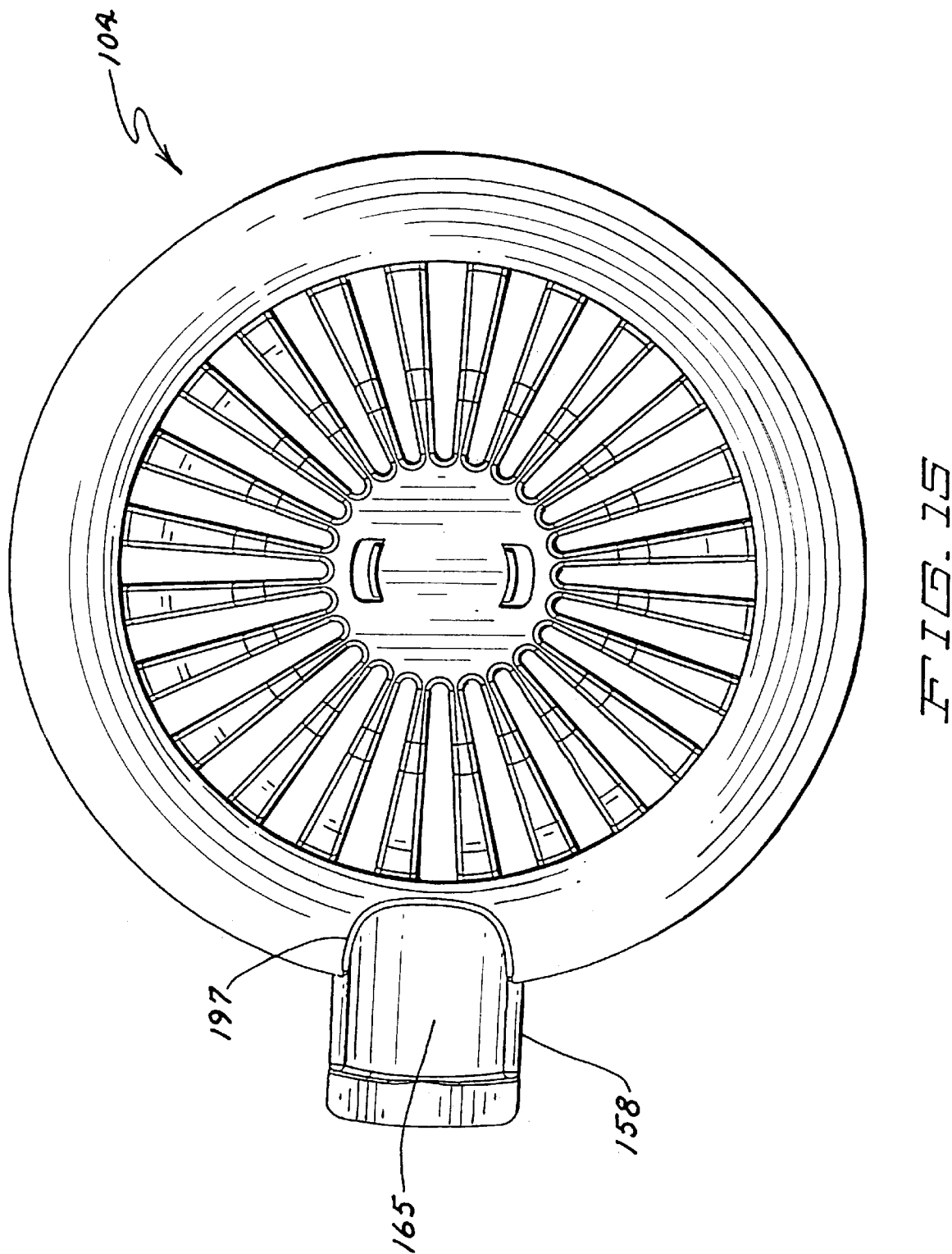
FIG. 15 is a plan view of the exterior or lower side of the choke member of FIG. 10.

To improve the efficiency of bell-mouthed entrance 199, sharp transitional features in and around the entrance are reduced. For example, exterior edge 168 of choke member 104 is substantially flush to exterior side 138 of air inlet grate 102 as shown in FIG. 16. Additionally, the intersection of channel 165 with bell-mouthed entrance 199 incorporates a generous chamfer 197 as shown in FIGS. 10 and 15. These features reduce air flow interruptions in and around bell-mouthed opening 199. By creating a smooth air flow pattern into the bell-mouthed entrance, the air flow rate through blower/vac inlet 114 is maximized.

Another benefit of the preferred entrance configuration is its minimal pressure loss characteristics. Because the pressure loss attributable to a specific entrance configuration is proportional to its energy loss, reducing pressure loss will improve entrance efficiency. While any entrance configuration will suffer some pressure loss as air accelerates into the entrance, it is generally perceived that the loss associated with the bell-mouthed entrance is lower in comparison. This minimal pressure loss, combined with the smooth air flow attributes described above, results in increased efficiency. This increased efficiency, in turn, allows a greater output air horsepower for a given motor horsepower.

Figure 20:
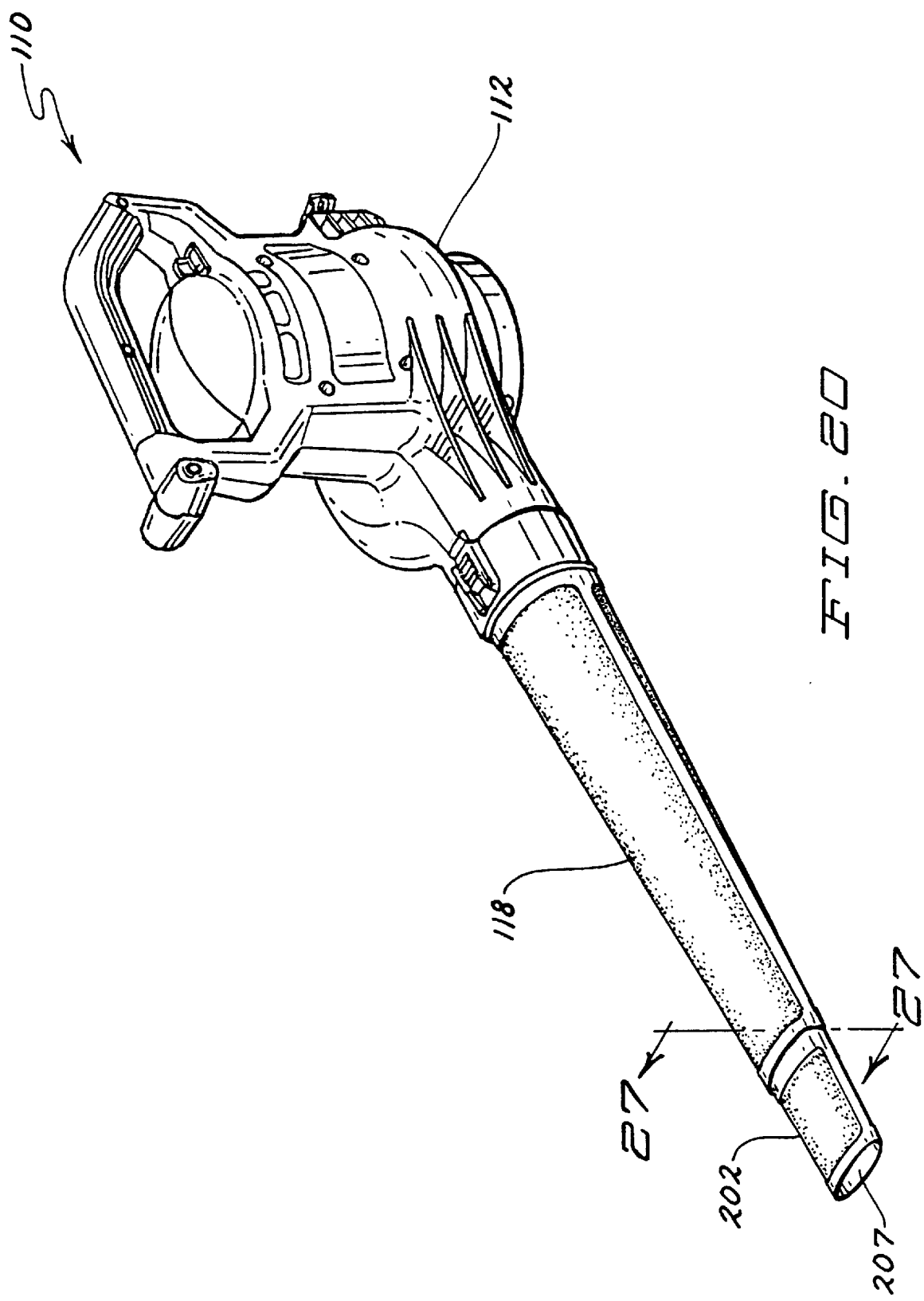
FIG. 20 is perspective view of the blower/vac of FIG. 3 with the air concentrator nozzle of the present invention connected to the extension tube.

The present invention additionally includes an air concentrator nozzle 202 (as shown in FIG. 20) which operatively connects to outlet orifice 120 of extension tube 118. Referring to FIGS. 21, 22–24 and 30, nozzle 202 has an upstream end 204 having an upstream opening 205 (best viewed in FIG. 30) and a downstream end 206 having a downstream opening 207 (best viewed in FIG. 21). The external perimeter of upstream end 204 defines a first outer cross-sectional area while the external perimeter of downstream end 206 defines a second outer cross-sectional area. Upstream opening 205 of upstream end 204 has an upstream height 222 and an upstream width 208 that tapers, over a nozzle length 212, to a downstream height 224 and a downstream width 210. While extension tube 118 and nozzle 202 of the preferred embodiment are elliptical in cross section, those skilled in the art will appreciate that the present invention could also be applied to other cross sections (e.g., circular, rectangular). For reasons that are discussed below, nozzle 202 also includes a nozzle slot 216 on both its upper and lower exterior surface and a nozzle tab 214 on each side proximate to upstream end 204.

Figure 21:
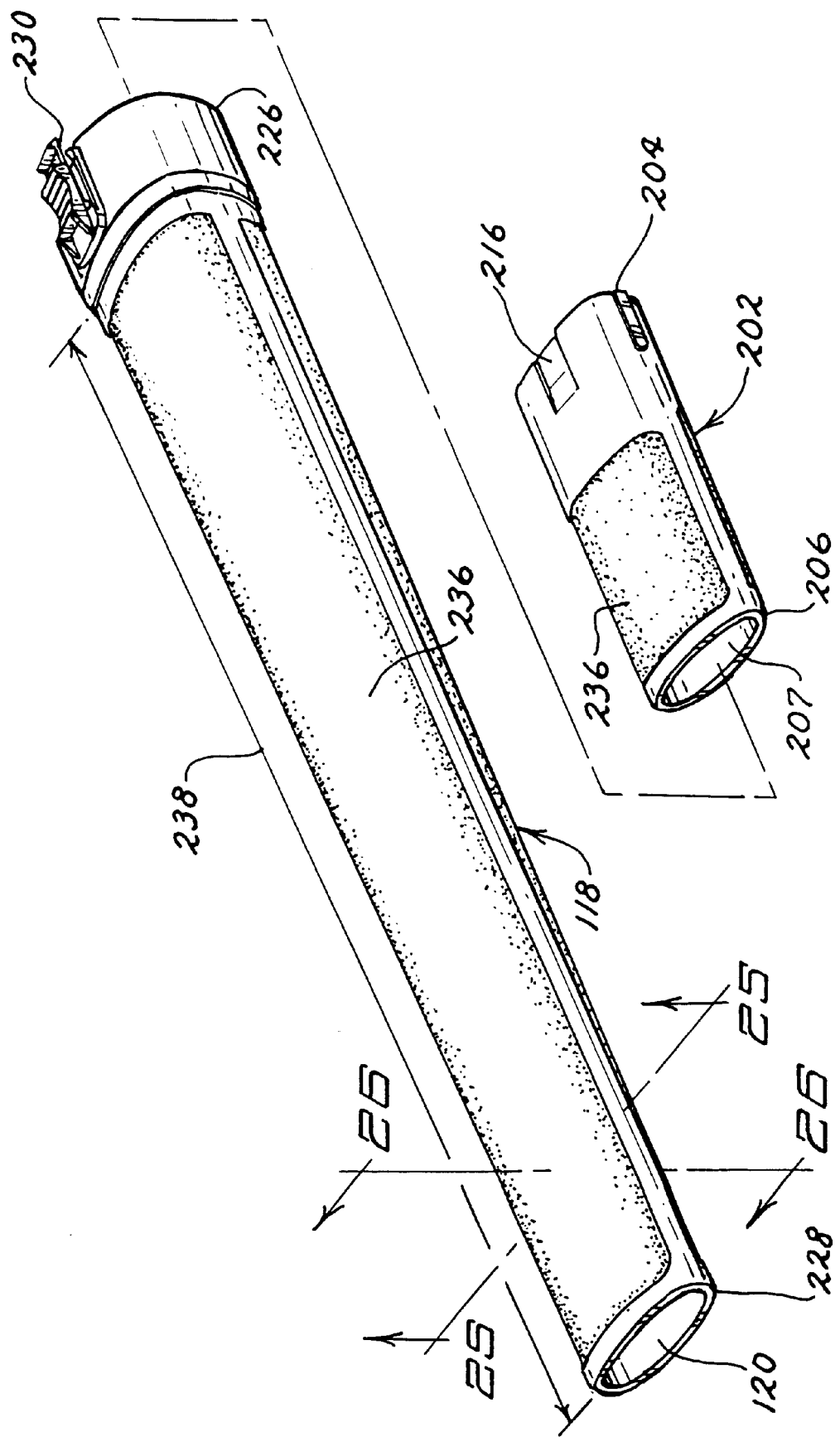
FIG. 21 is an exploded view of the extension tube and nozzle.
Figure 24:
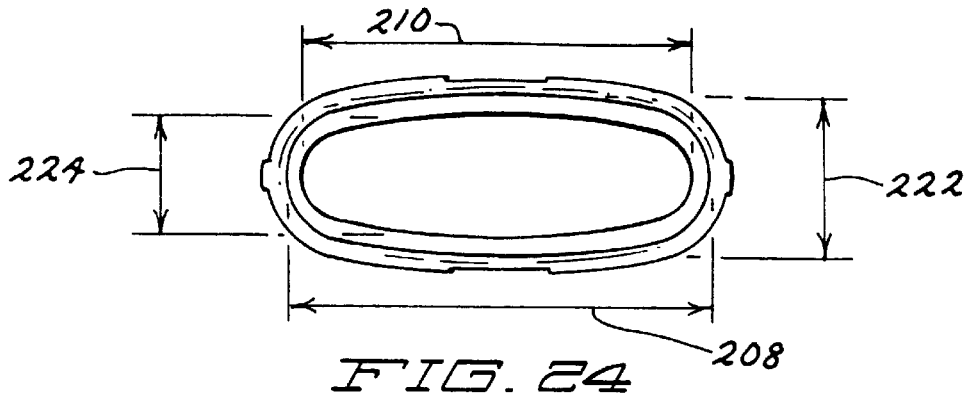
FIG. 24 is a rear elevational view of the nozzle of FIG. 22.
Figures 22, 23:
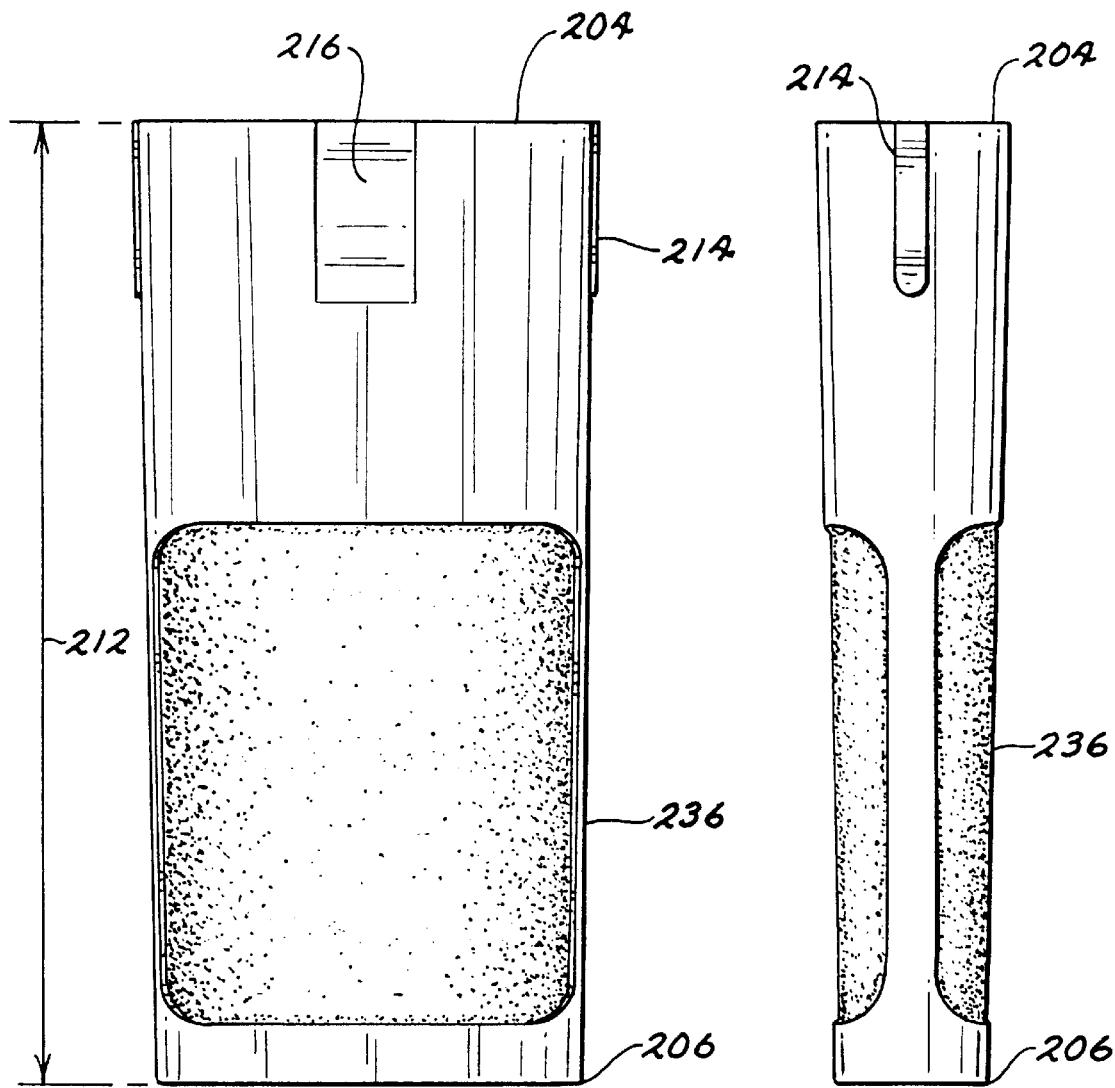
FIG. 22 is a top plan view of the nozzle of the present invention.
FIG. 23 is a side elevational view of the nozzle of FIG. 22.
Figure 31:
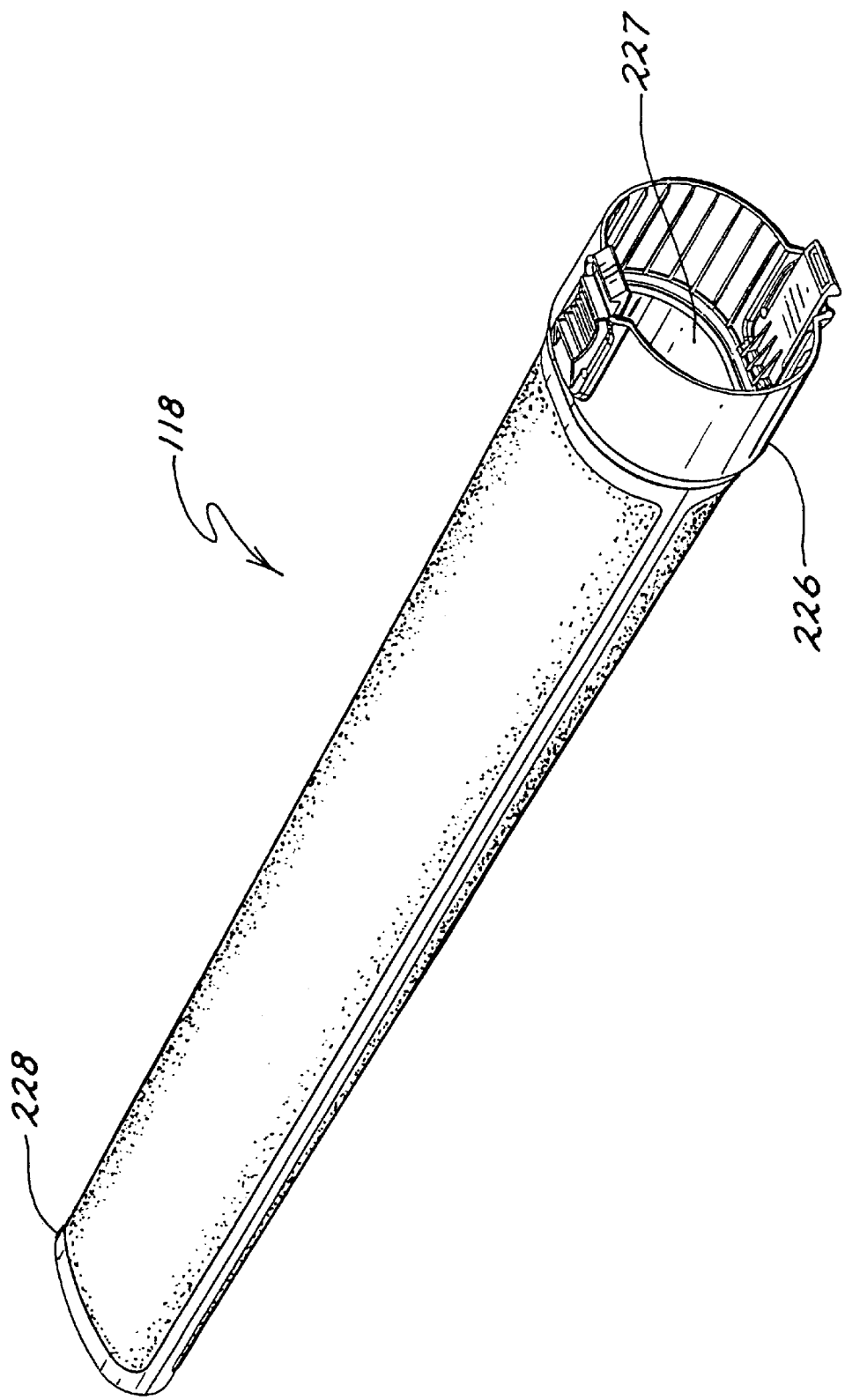
FIG. 31 is a perspective view of the extension tube showing the extension tube upstream opening.

Referring to FIGS. 21, 28 and 31, extension tube 118 of the preferred embodiment has an upstream end 226 having an upstream opening 227 (best viewed in FIG. 31). Upstream end 226 attaches to air outlet 116 (shown if FIG. 4) and extends over a length 238 to a downstream end 228 at which is formed outlet orifice 120 (best viewed in FIG. 21). The internal perimeter of upstream opening 227 of upstream end 226 defines a first inner cross-sectional area while the internal perimeter of outlet orifice 120 of downstream end 228 defines a second inner cross-sectional area. Outlet orifice 120 is defined by a downstream opening width 232 and a downstream opening height 234. A longitudinal spine 220, which is best viewed in FIGS. 25 and 26, spans the interior, upper side of tube 118 generally between upstream end 226 and downstream end 228. For descriptive purposes, spine 220 is defined as being on the upper or "top" side of tube 118. However, tube 118 may also be attached with spine 220 oriented elsewhere (e.g., on the lower side). Extension tube 118 additionally includes a slot 218 on each interior side of the tube. In the preferred embodiment, slots 218 span generally the entire length of tube 118.

Both extension tube 118 and nozzle 202 include a series of recessed areas 236 as shown in FIG. 21. In the preferred embodiment, these recessed areas are provided to create an aesthetically pleasing appearance.

Figure 29:
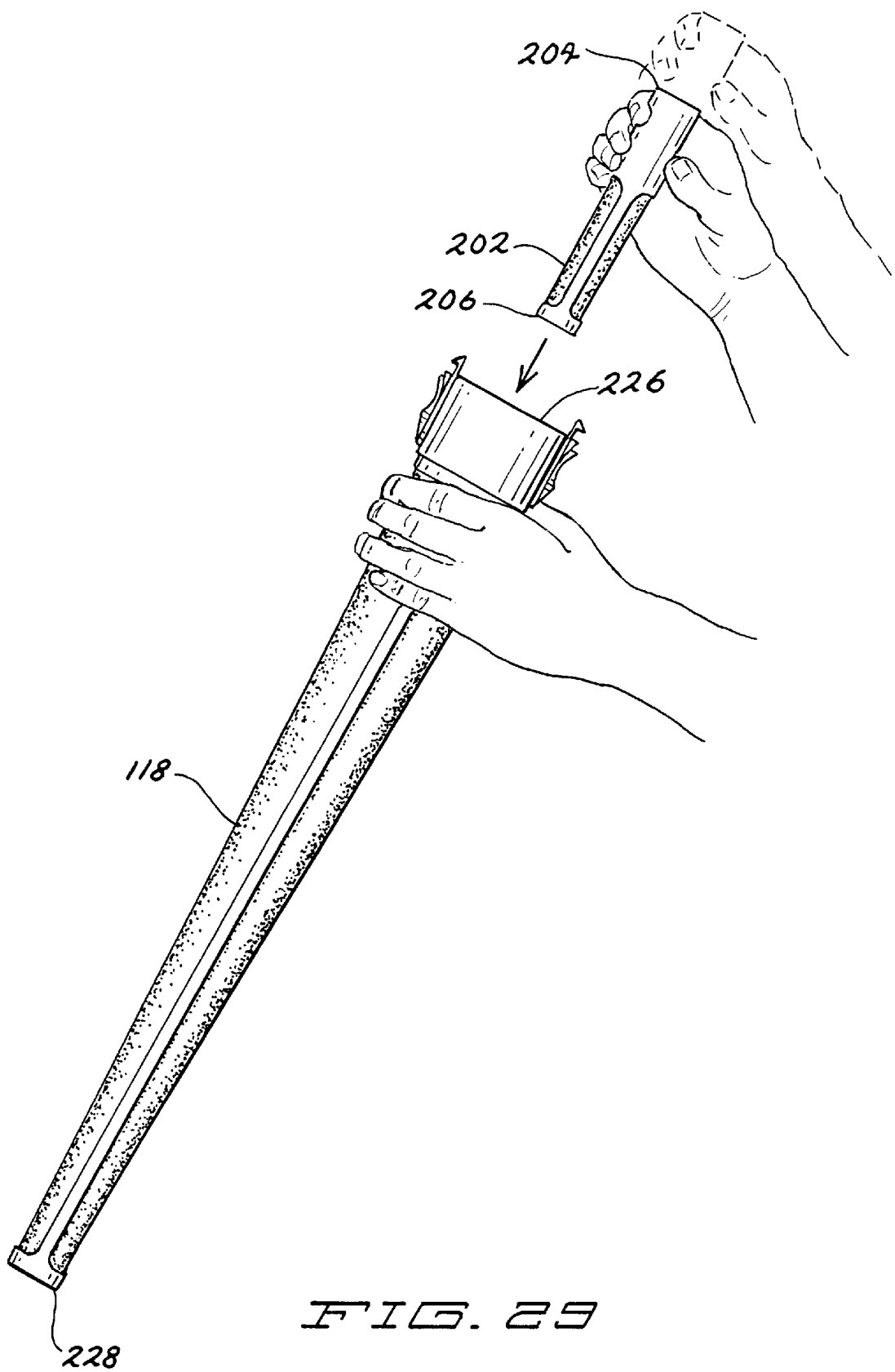
FIG. 29 is a side elevational view showing the method used to install the nozzle into the extension tube.
Figure 90:
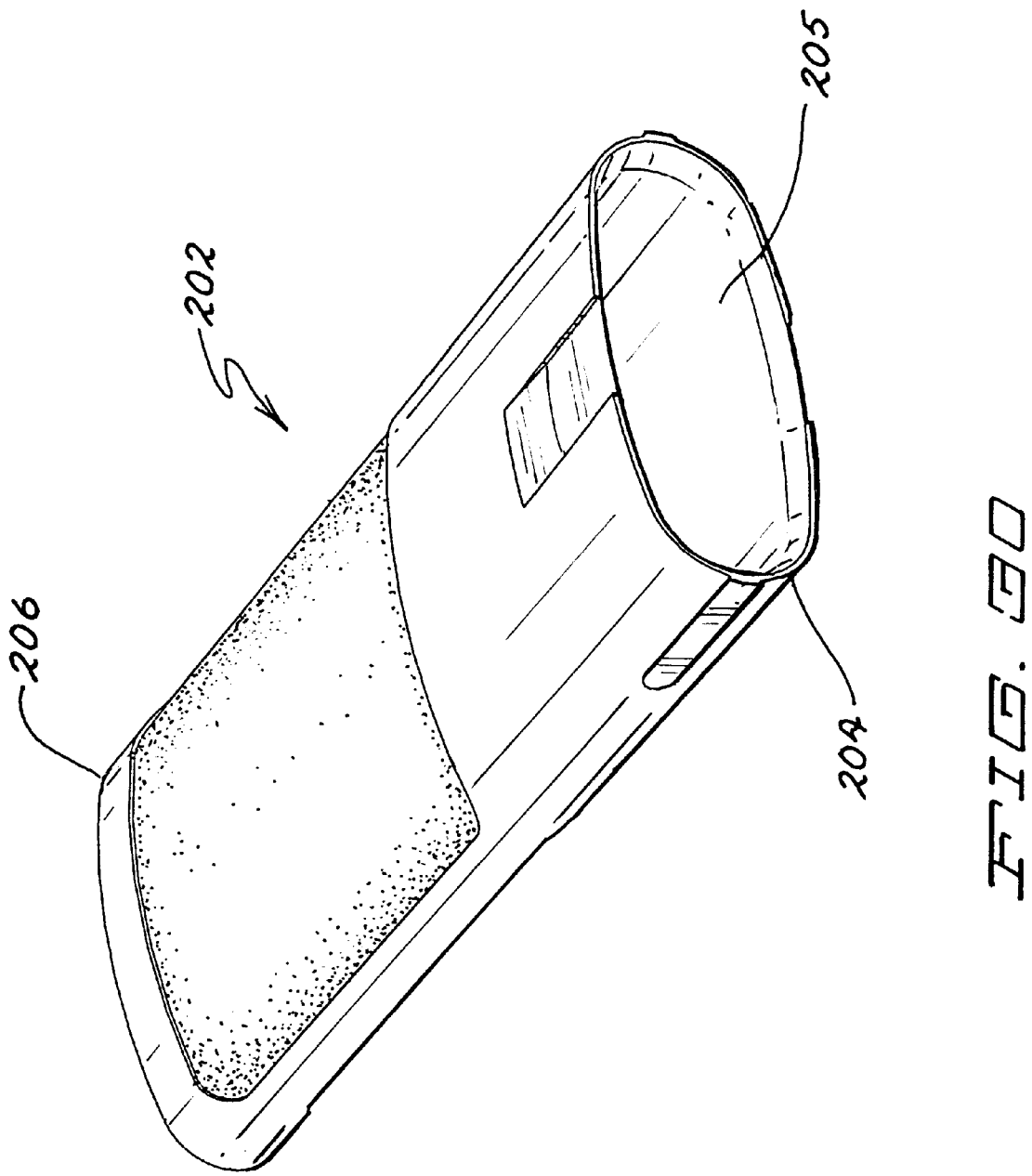

For most conditions, extension tube 118 is all that is required for efficient operation. However, when desired, the operator may elect to increase the velocity and the corresponding air pressure of the output air stream by installing nozzle 202. Installation of nozzle 202 first requires that the operator deactivate motor 108. Extension tube 118 must then be removed from air outlet 116. Removal is accomplished by operator manipulation of a pair of tabs 230—best shown in FIG. 21—which engage receiving slots (not shown) in housing 112 when tube 118 is installed thereto. Once tube 118 is removed, it is grasped in a first hand as shown in FIG. 29 and held such that upstream end 226 is located above downstream end 228. Nozzle 202 may then be "dropped," downstream end 206 first, into upstream end 226 of tube 118. Nozzle 202 will then fall toward downstream end 228 of tube 118 and lodge into position as depicted in FIG. 27. Alternatively, an extension tube and nozzle combination could be configured such that the desired increase in velocity is obtained without having the nozzle protrude from the downstream end of the extension tube. That is, the nozzle could be retained in the extension tube such that its downstream end is positioned somewhat upstream of the downstream end of the extension tube. Yet, the resultant velocity would increase since the effective outlet cross-sectional area of the extension tube would be decreased. Once nozzle 202 is in position, the operator may re-attach tube 118 (now with attached nozzle 202) to air outlet 116 and resume operation. Air passing through tube 118 and nozzle 202 exerts outward pressure on the nozzle, constantly forcing it into place.

When connected, nozzle 202 causes the exit air velocity to increase by reducing the effective outlet area of extension tube 118. In the preferred embodiment, concentrator nozzle 202 increases the effective length of extension tube 118 by approximately 20% and reduces the effective cross sectional area by approximately 40%. While extension tube 118 optimizes output air horsepower, nozzle 202 optimizes blower air velocity. Various dimensional data regarding nozzle 202 and extension tube 118 is presented in Table A. All cross-sectional dimensions are interior dimensions unless otherwise noted.

TABLE A

| Item # | Dimension, inches |
|--------|-------------------|
| 208    | 2.65              |
| 210    | 2.48              |
| 212    | 6.00              |
| 222    | 1.03              |
| 224    | 0.78              |
| 232    | 2.78              |
| 234    | 1.10              |
| 238    | 21.3              |

Referring to FIGS. 27 and 28, sealing of the nozzle to the extension tube will now be discussed. Effective sealing is necessary in order to maximize the air velocity benefits of nozzle 202. In the preferred embodiment, the general shape of nozzle 202 is substantially similar to extension tube 118. This provides, for the most part, an effective sealing surface. However, spine 220 and tube slots 218 create discontinuities along the smooth, elliptical interior surface of tube 118. Thus, nozzle slot 216 and nozzle tabs 214 are necessary to seal these areas. When installed, nozzle slot 216 is in communication with spine 220 and nozzle tabs 214 are in communication with tube slots 218. This configuration results in a generally airtight seal between the interior surface of tube 118 and the exterior surface of nozzle 202. Nevertheless, a small gap 240 does exists on the lower side of tube 118 proximate to lower slot 216. Gap 240 results because slot 216 exists on both sides of nozzle 202 but spine 220 exists on only the top side of tube 118. The air leakage resulting from gap 240 is negligible and is perceived by applicants to be outweighed by the benefits of having a fully reversible nozzle (i.e., nozzle 202 may be installed "either side up").

The cross sectional shape of tube 118 and nozzle 202 controls the relative orientation of the two parts. However, where another cross sectional shape is used, (i.e., circular), tabs 214 and slots 218 may orient nozzle 202 with respect to tube 118 and prevent relative rotation therebetween. While the extension tube of the preferred embodiment utilizes only one outlet orifice, the present invention is also applicable to those blowers having extension tubes with two or more outlet orifices.

Removal of nozzle 202 is accomplished by first deactivating motor 108 and then removing extension tube 118 as described above. Holding tube 118 with downstream end 228 elevated above upstream end 226, the operator can dislodge nozzle 202 by pushing it toward upstream end 226. The nozzle will then slide easily out of extension tube 118. The extension tube may then be reinstalled to air outlet 116.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the claimed apparatus, and equivalents thereof.

We claim:

1. A portable blower comprising:
   a) a housing including an air outlet;
   b) an extension tube removably engageable with the air outlet and including an upstream end with an upstream opening and a downstream end with an outlet orifice; and
   c) an air concentrator nozzle for insertion into the extension tube, the nozzle including an upstream end and a downstream end wherein the nozzle, when dropped downstream end first into the upstream end of the extension tube, falls to the downstream end of the extension tube and partially protrudes from the downstream end of the extension tube but is retained from further downstream movement in an interference fit relationship with the extension tube.

2. The portable blower of claim 1, wherein the upstream end of the extension tube includes a first inner cross-sectional area and the downstream end of the extension tube includes a second inner cross-sectional area which is smaller than the first inner cross-sectional area.

3. The portable blower of claim 2, wherein the upstream end of the nozzle has a first outer cross-sectional area and the downstream end of the nozzle has a second outer cross-sectional area which is smaller than the first outer crosssectional area.

4. The portable blower of claim 3, wherein the first outer cross-sectional area of the nozzle is smaller than the first inner cross-sectional area of the extension tube, the first outer cross-sectional area of the nozzle is larger than the second inner cross-sectional area of the extension tube and wherein the second outer cross-sectional area of the nozzle is smaller than the second inner cross-sectional area of the extension tube.

5. In a portable blower with a housing including an air outlet, an extension tube removably engageable with the air outlet and including an upstream end with an upstream opening and a downstream end with an outlet orifice, an air concentrator nozzle comprising:
   a) an upstream end; and
   b) a downstream end with a downstream opening having a smaller crosssectional area than the cross-sectional area of the outlet orifice of the extension tube
   wherein the nozzle, when dropped downstream end first into the upstream end of the extension tube, falls toward the downstream end of the extension tube but is stopped in the downward fall at some point within the extension tube and retained from further downstream movement relative to the extension tube.

6. The portable blower of claim 5, wherein the nozzle, when dropped downstream end first into the upstream end of the extension tube, falls to a point where the nozzle protrudes partially from the downstream end of the extension tube.

7. A method for increasing the exit air velocity capability of a portable blower, wherein the blower has a housing and an air outlet on the housing, an extension tube removably engageable with the air outlet and including an upstream end with an upstream opening and a downstream end with an outlet orifice, and an air concentrator nozzle with an upstream end and a downstream end, comprising the steps of:
   a) removing the extension tube from the air outlet;
   b) inserting the nozzle, downstream end first, into the upstream end of the extension tube;
   c) positioning the upstream end of the extension tube above the downstream end of the extension tube enabling the nozzle to slide to the downstream end of the extension tube such that the nozzle partially protrudes from the downstream end of the extension tube; and
   d) attaching the extension tube to the air outlet.

8. A method for decreasing the exit air velocity capability of a portable blower, wherein the blower has a housing and an air outlet on the housing, an extension tube removably engageable with the air outlet and including an upstream end with an upstream opening and a downstream end with an outlet orifice, and an air concentrator nozzle with an upstream end and a downstream end, comprising the steps of:
   a) removing the extension tube from the air outlet;
   b) forcing the downstream end of the nozzle toward the upstream end of the extension tube until it dislodges;
   c) positioning the upstream end of the extension tube below the downstream end of the extension tube, thereby enabling the nozzle to slide to the upstream end of the extension tube such that the nozzle can be removed from the upstream end of the extension tube; and
   d) attaching the extension tube to the air outlet.

9. A portable blower comprising:
   a) a housing including an air outlet;
   b) a extension tube removably engageable with the air outlet and including an upstream end with an upstream opening and a downstream end with an outlet orifice of smaller cross-sectional area than the upstream opening; and
   c) an air concentrator nozzle for insertion into the extension tube, the nozzle including an upstream end with an upstream opening and a downstream end with a downstream opening of smaller cross-sectional area than the cross-sectional area of the outlet orifice of the extension tube
   wherein the nozzle, when dropped downstream end first into the upstream end of the extension tube, falls to the downstream end of the extension tube and wherein the insertion of the nozzle increases the velocity of the air exiting the blower compared to the velocity of the air exiting the blower without the nozzle.

* * * * *